(12) United States Patent
Napier

(10) Patent No.: US 7,413,634 B1
(45) Date of Patent: Aug. 19, 2008

(54) DISTILLATION SYSTEM

(76) Inventor: Mark W Napier, 171 Laramie Trail, Lincoln, NE (US) 68521

( * ) Notice: Subject to any disclaimer, the term of this patent is extended or adjusted under 35 U.S.C. 154(b) by 564 days.

(21) Appl. No.: 10/244,963

(22) Filed: Sep. 17, 2002

Related U.S. Application Data

(60) Provisional application No. 60/323,138, filed on Sep. 18, 2001.

(51) Int. Cl.
*B01D 1/26* (2006.01)
*B01D 3/10* (2006.01)

(52) U.S. Cl. ............... 202/153; 202/154; 202/155; 202/174; 202/186; 202/197; 202/205; 159/17.1; 159/DIG. 8; 159/DIG. 16

(58) Field of Classification Search ......... 202/153–155, 202/174, 186, 205, 197; 159/17.1, 2.1, DIG. 8, 159/DIG. 16

See application file for complete search history.

(56) References Cited

U.S. PATENT DOCUMENTS

| | | | |
|---|---|---|---|
| 799,002 | A | 9/1905 | Hodges et al. |
| 799,003 | A | 9/1905 | Hodges et al. |
| 945,640 | A | 1/1910 | Thelen et al. |
| 2,159,303 | A | 5/1939 | Waterman et al. |
| 3,004,590 | A | 10/1961 | Rosenblad |
| 3,251,397 | A | 5/1966 | Lens |
| 3,275,530 | A | 9/1966 | Akers |
| 3,487,873 | A | 1/1970 | Bromley et al. |
| 3,497,423 | A | 2/1970 | Rodgers |
| 3,527,676 | A | 9/1970 | Hingst et al. ............. 203/11 |
| 3,532,152 | A | 10/1970 | Cartinhour |
| 3,536,591 | A | 10/1970 | Lotz |
| 3,562,116 | A | 2/1971 | Rodgers |
| 3,575,817 | A | 4/1971 | Brown |
| 3,779,871 | A | 12/1973 | Brown |
| 3,825,491 | A | 7/1974 | Sanchez ............. 202/176 |
| 3,907,629 | A | 9/1975 | Machida et al. ........ 159/13 A |
| 3,930,958 | A | 1/1976 | Maruichi ............. 202/174 |
| 3,930,959 | A | 1/1976 | Kirschmann ........... 202/181 |
| 4,046,637 | A | 9/1977 | Sasaki ............. 202/174 |
| 4,057,034 | A | * 11/1977 | Farquhar et al. ........ 376/316 |
| 4,170,514 | A | 10/1979 | Pagani |
| 4,200,600 | A | 4/1980 | Myreen |
| 4,260,461 | A | * 4/1981 | Pottharst, Jr. ........... 203/7 |
| 4,329,204 | A | 5/1982 | Petrek et al. |

(Continued)

FOREIGN PATENT DOCUMENTS

AU 485807 1/1976

(Continued)

*Primary Examiner*—Virginia Manoharan

(57) ABSTRACT

A multiple effect distillation chamber includes a plurality of separate distilling chambers and a drain chamber at a downstream end of the distilling chambers. The drain chamber functions to create a vacuum to draw volatile gases and impurities collected at the end of the distilling chambers into the drain chamber. The drain chamber cools the volatile gases via cooling water, whereby the cooling water and volatile gases are not mixed during the cooling process, such that the cooling water may be recycled and reused. The drain chamber may include two heat exchangers, each receiving cooling water from a separate water source. Utilizing separate water sources in conjunction with the dual heat exchangers of the drain chamber enables the flow rates of the cooling water sources to be adjusted to enable the disposal of waste water from the distiller at any desired temperature without affecting other functions of the distillation system.

5 Claims, 13 Drawing Sheets

U.S. PATENT DOCUMENTS

| | | | | |
|---|---|---|---|---|
| 4,329,205 | A | 5/1982 | Tsumura et al. | |
| 4,331,514 | A | 5/1982 | Bauer | |
| 4,339,307 | A | 7/1982 | Ellis, Jr. | 202/176 |
| 4,341,599 | A | 7/1982 | Watson et al. | |
| 4,402,793 | A | 9/1983 | Petrek et al. | |
| 4,451,334 | A | 5/1984 | Ciocca et al. | |
| 4,475,988 | A | 10/1984 | Tsumura et al. | |
| 4,482,431 | A | 11/1984 | Voorhees | |
| 4,521,276 | A | 6/1985 | Tsumura et al. | |
| 4,676,870 | A | 6/1987 | Stewart et al. | |
| 4,696,718 | A | 9/1987 | Lasater | 202/176 |
| 4,805,692 | A | 2/1989 | Palmer et al. | 165/110 |
| 4,836,891 | A * | 6/1989 | Files et al. | 159/28.1 |
| 4,888,097 | A | 12/1989 | Palmer et al. | 203/1 |
| 4,894,123 | A | 1/1990 | Helmich | 202/176 |
| 4,943,353 | A | 7/1990 | Shannon | 202/181 |
| 4,975,154 | A | 12/1990 | Palmer et al. | 203/1 |
| 5,068,030 | A | 11/1991 | Chen | 210/95 |
| 5,094,721 | A | 3/1992 | Petrek | |
| 5,178,734 | A | 1/1993 | Palmer | 202/176 |
| 5,266,170 | A | 11/1993 | Weber et al. | 202/185.3 |
| 5,281,309 | A | 1/1994 | Greene | 202/181 |
| 5,286,349 | A * | 2/1994 | Shurtleff | 196/46 |
| 5,286,350 | A | 2/1994 | Huang | |
| 5,290,402 | A | 3/1994 | Tsai | 202/181 |
| 5,464,531 | A | 11/1995 | Greene | 202/181 |
| 5,565,065 | A | 10/1996 | Wang | 202/176 |
| 5,630,913 | A * | 5/1997 | Tajer-Ardebili | 202/176 |
| 5,662,779 | A | 9/1997 | Greene et al. | 202/181 |
| 5,705,036 | A | 1/1998 | Wu et al. | 202/176 |
| 5,925,223 | A * | 7/1999 | Simpson et al. | 203/11 |
| 5,927,553 | A | 7/1999 | Ford | 222/129.4 |
| 6,193,849 | B1 * | 2/2001 | Lockett, Jr. | 203/2 |
| 6,254,734 | B1 * | 7/2001 | Sephton | 203/2 |
| 6,428,656 | B1 * | 8/2002 | Bleth et al. | 202/185.1 |

FOREIGN PATENT DOCUMENTS

| | | |
|---|---|---|
| CH | 33372 | 3/1905 |
| DE | 819839 | 11/1951 |

\* cited by examiner

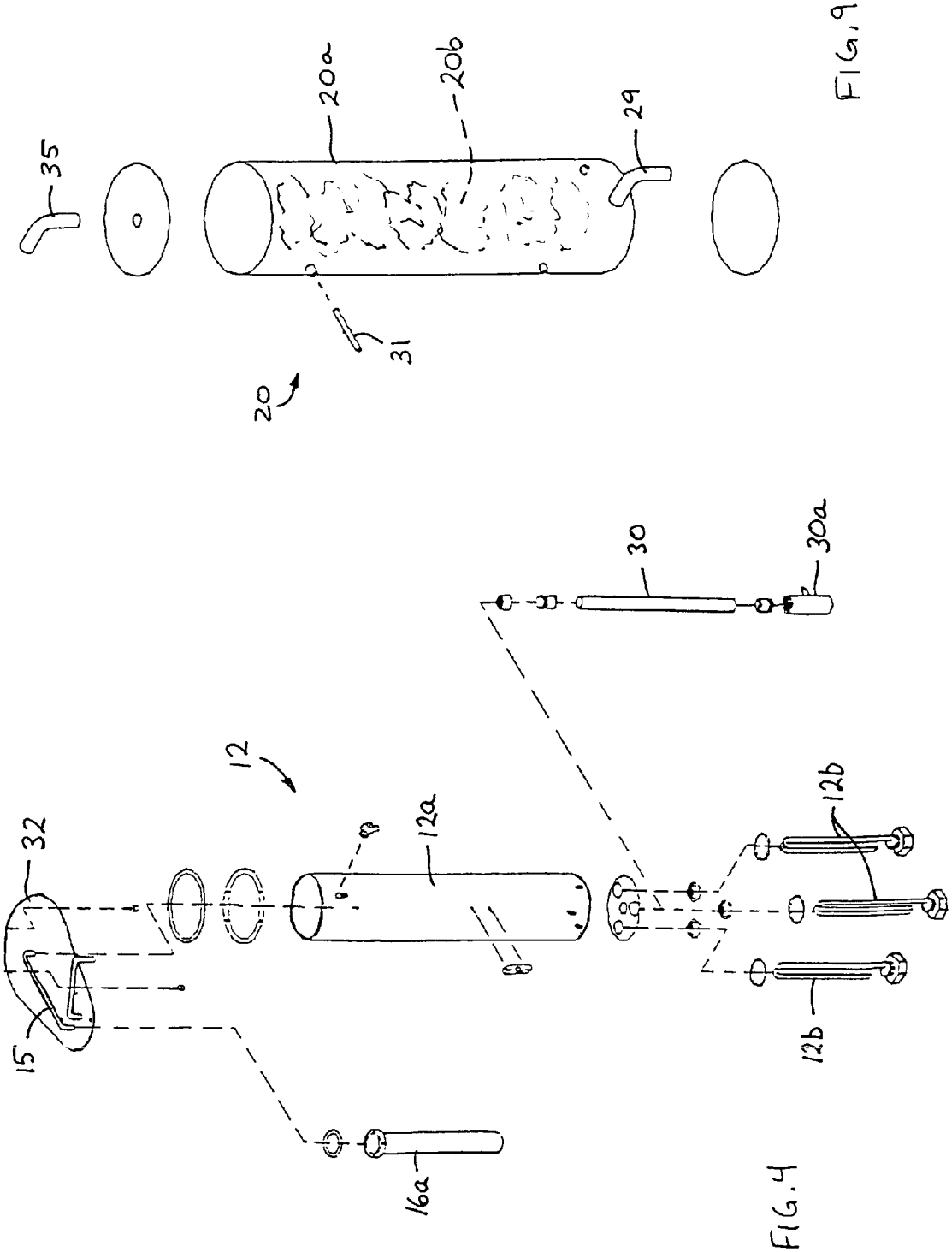

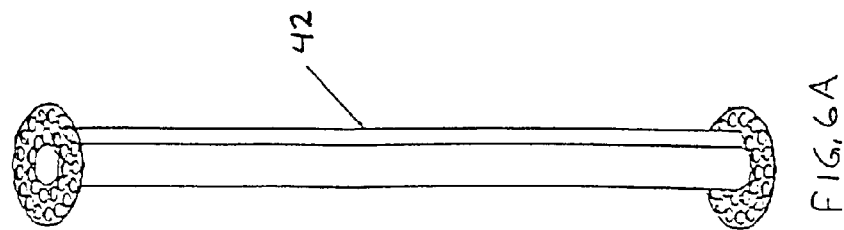
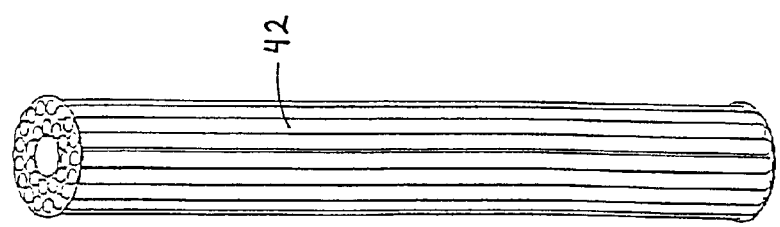
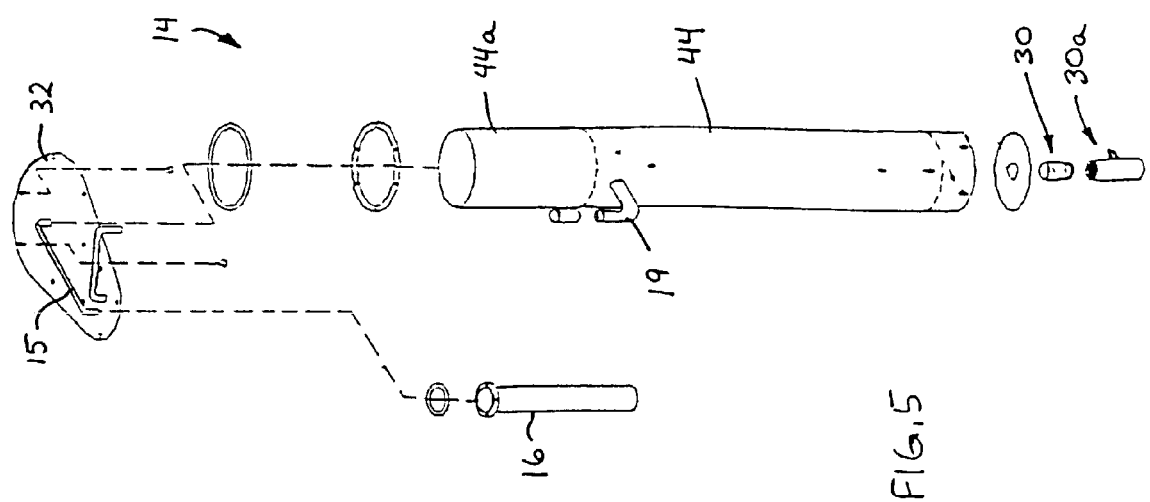

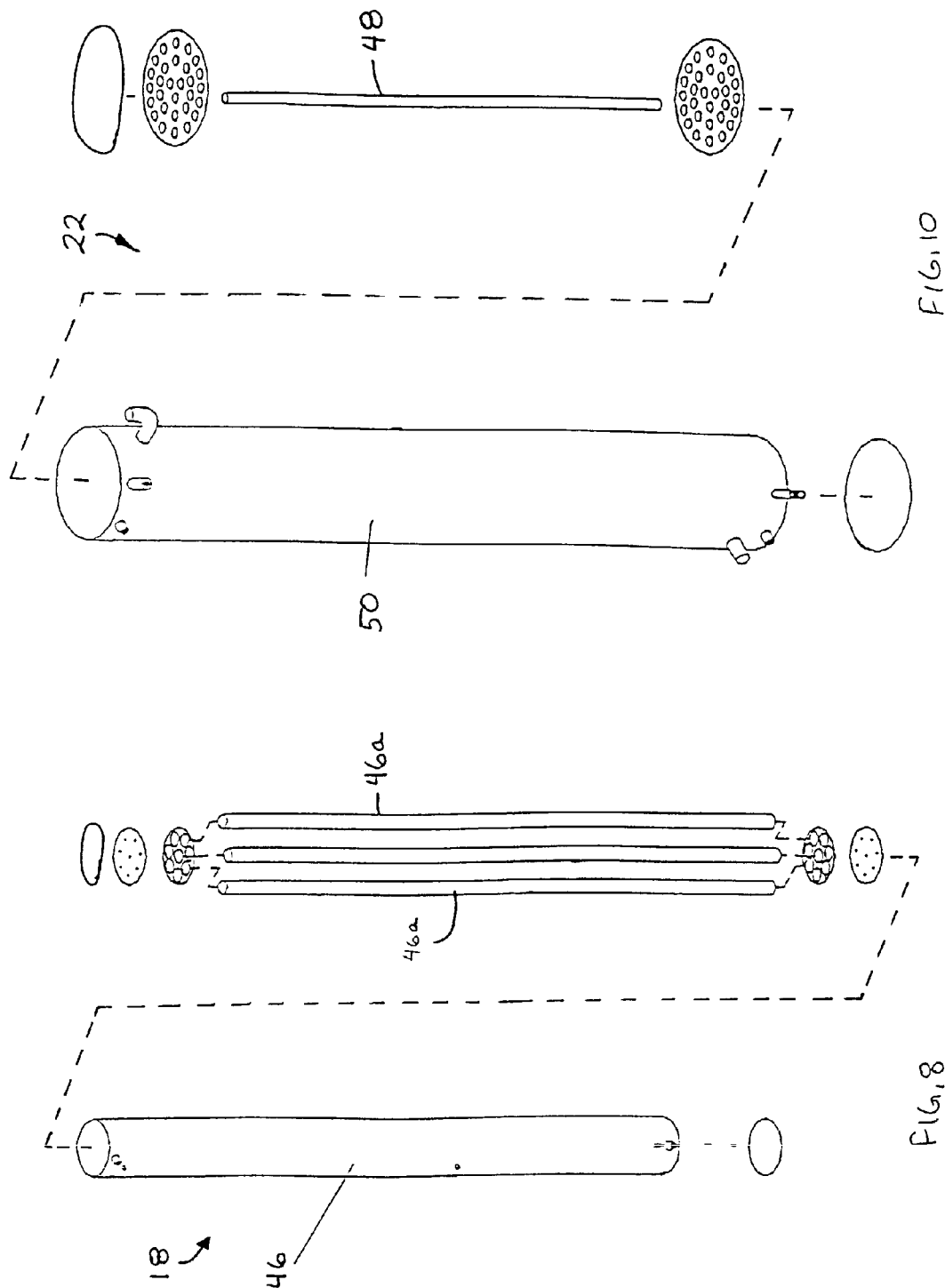

DISTILLATION SYSTEM

CROSS REFERENCE TO RELATED APPLICATION

The present application claims priority of U.S. provisional application Ser. No. 60/323,138, filed Sep. 18, 2001 by Napier for DISTILLATION SYSTEM, which is hereby incorporated herein by reference in its entirety.

FIELD OF THE INVENTION

The invention relates to distillation systems and, more particularly, to multiple effect water distillation systems.

BACKGROUND OF THE INVENTION

In multiple effect distillation systems, a series of distillation chambers, or "effects", are utilized in order to distill water to remove contaminates and otherwise unpalatable substances therefrom. Each chamber or "effect" of a multiple effect distiller is maintained at a preselected internal pressure, and specifically, each subsequent chamber is maintained at a pressure lower than the immediately preceding chamber. This controlled, descending pressure from the first to the last chamber enables the steam generated from one chamber to be transferred to a subsequent chamber and utilized as a heat exchange medium so as to vaporize the feed water within each chamber. That is, as the pressure in each successive chamber is less than the prior chamber, the corresponding boiling temperature of the water is also lower, and thereby enables utilization of the steam of the previous chamber to be used as the heat exchange medium for the subsequent chamber. The re-use of steam as a heat exchange medium increases the efficiency of the distillation process.

As multiple effect distillers become more commonly utilized in retail establishments, such as supermarkets, convenience centers, and the like, an additional problem confronted by multiple effect distillers is the inability to access and perform routine maintenance while minimizing the size of the distiller and/or the space surrounding the distiller required to do such maintenance. As an increasing number of retailers desire to provide their consumers with a source of distilled water, multiple effect distillers are being employed in commercial environments where floor space translates into selling space and, consequently, effective space utilization must be observed. However, existing multiple effect distillers, if they provide easy access in order to permit routine maintenance, require additional floor space around the distiller for access to the different components at different sides of the distiller. In some designs, the distiller may be reduced in size, but then, although compact, the reduced size comes at the expense of easy access to the components.

Another concern with existing multiple effect distillers is their exclusive reliance upon a main controller to operate the distiller. With most multiple effect distillers, a main electrical controller controls all of the distiller's components and, consequently, each component of the distiller must be separately wired to the main controller. Connecting each component to the main controller increases the complexity of the manufacturing and installation process. Further, the number and length of the electrical wires which must be attached to the main controller increases the probability of an electrical malfunction.

Additionally, reliance upon a main controller increases the complexity and cost of identifying and subsequently rectifying a malfunction. Often, if one element of the main controller fails, for example, an element which monitors one of the chambers, it is difficult to isolate that one element within the circuit board, and, thus, frequently requires the replacement of the entire circuit board.

The inability of many multiple effect distillers to efficiently and adequately separate the steam from any entrained water droplets is an additional issue confronted by the distillation industry. Failure to successfully separate the steam from the water in each chamber adversely effects the purity of the distillate resulting from the distillation process. Specifically, the distillation process may be compromised by any entrained water droplets from one chamber being transferred into the heat exchanger of a subsequent chamber, and thereby adding impurities to the distillate in the subsequent chamber.

Sensing of the feed water level within each chamber also presents issues for existing multiple effect distillers. As the feed water level in each chamber must be monitored and maintained within a particular range, a sensor must be used. Normally, such a sensor is either of the conductive probe type or mechanical valve type, both of which require direct contact with the boiling water within the chamber. Contact between the heated fluid and the sensor over time causes the sensor to become coated or damaged by substances contained in the boiling water. Also, when using conductive probe technology, the large variation of water conductivity in water supplies based upon their geographical location has reduced the precision with which the conductive probe technology can be utilized in multiple effect distillers.

In most multiple effect distillers, subsequent to the distillation of water through the series of chambers, the distillate and volatile gases contained within the feed water are subjected to a final condensation phase. After final condensation, the distillate and volatiles are forwarded to a separation system which sequentially separates the volatile gases from the distillate and forwards the volatile gases to a volatile disposal or drain chamber. Normally, the separation system includes a volatile separation chamber configured to separate the volatile gases from the distillate. The volatile gases are then transferred from the volatile separation chamber into a volatile disposal chamber wherein the volatile gases are mixed with a fluid, and brought to a temperature suitable for disposal in the operator's drainage system.

The water forwarded to the volatile disposal chamber, commonly referred to as "blowdown water," is usually at an elevated temperature and transferred from the last distillation chamber or effect. Cooling water is utilized to cool the blowdown water and the volatile gases prior to the water and gases being discharged to the drainage system. The cooling water is sprayed into the volatile disposal chamber and mixes with the blowdown water and volatile gases. In order to conserve water, the cooling water source is cycled on and off for a predetermined period of time. However, as current regulations control the temperature at which a fluid may be introduced to a municipal drainage system, as well as the prevalent use of polymeric pipes which are more susceptible to damage at high temperatures, in order to bring the fluids to an adequate temperature, the cooling water source is often left on. As the cooling water is not separated from the blowdown water and volatile gases, continuously maintaining the flow of cooling water greatly increases water consumption and prohibits the cooling water from being recycled. This in turn increases the operating costs and reduces the efficiency of the distillation system.

In order to maintain distillate purity and palatability, it is routinely required to drain the distilling chambers in order to clean the chambers. With existing distillers, an operator must slide a pan or container under the distiller frame and empty the distilling chambers. As the operator must manually open the distilling chamber, the proximity to the drain at which an operator must be positioned during the draining procedure may cause injury to the operator as the hot water from the distilling chamber splashes onto the pan positioned therebelow.

Therefore, there exists a need for a multiple effect distiller which is efficient, reliable and safe to operate, and which overcomes the problems confronted by existing multiple effect distillers.

SUMMARY OF THE INVENTION

The present invention is intended to provide a multiple effect distillation system which is efficient, easy to maintain, and which is able to recycle the cooling water used to cool the blowdown water and volatile gases.

According to an aspect of the present invention, a distillation system comprises a boiler for boiling raw water fed from a source and generating steam and gases, at least one condenser for condensing at least some of the steam into distillate, and a drain chamber. The drain chamber is operable to receive at least some gases from the boiler and to cool at least some of the gases and steam to a liquid state. The drain chamber is configured to discharge the liquid to a drain. The drain chamber is in fluid communication with at least one water source for receiving cooling water. The drain chamber cools the gases and steam via heat transfer between the gases and steam and the cooling water while the cooling water is separated from the gases and steam by at least one wall of the drain chamber.

In one form, the drain chamber includes an interior, an inlet, a first heat exchanger positioned proximate to the inlet, an outlet, and a second heat exchanger positioned in the interior proximate to the outlet. The separate heat exchangers are fluidly connected to separate water sources and, therefore, may be operated at different temperatures to adequately control the temperature of the fluid discharged from the distiller. Further, as the heat exchangers may be operated at different temperatures, the rate of temperature decrease from the inlet to the outlet reduces the tendency of distillate and steam to be drawn into the drain chamber. This increases efficiency and reduces the problems attendant to the placement of heated fluids within a drainage system.

According to another aspect of the present invention, a distillation system comprises at least one steam generating tank for receiving raw water from a source and generating steam and gases, at least one condenser for condensing at least some of the steam into distillate, a gas separating chamber for receiving gases from the tank and distillate from the at least one condenser, and a drain chamber. The gas separating chamber is configured to separate gases from the distillate and the gases, and to discharge substantially pure distillate therefrom. The drain chamber is connected to the gas separating chamber and is configured to create a vacuum to draw at least some of the separated gases from the gas separating chamber. The drain chamber is configured to create the vacuum by condensing the steam and/or gases within the drain chamber.

According to still yet another aspect of the present invention, a distiller comprises a plurality of distilling chambers and a first separation chamber in fluid communication with at least one distilling chamber of the plurality of distilling chambers. The first separation chamber receives volatile gases from at least one of the distilling chambers. A second separation chamber is in fluid communication with the first separation chamber and has an interior and an inlet through which volatile gases from the first separation chamber are received. The second separation chamber is configured to create a vacuum in at least a section of the interior to thereby draw volatile gases from the first separation chamber into the interior of the second separation chamber. The use of a second separation chamber configured to impart a vacuum on a first separation chamber to draw volatile gases increases the efficiency of the distillation process.

According to yet another aspect of the present invention, a distiller comprises at least one chamber configured to produce steam and a steam separator in fluid communication with the chamber. The steam separator has an interior and an upper region, with the upper region including a steam inlet and the steam outlet. Steam from the chamber enters the steam separator's interior through the steam inlet and exits therefrom at the steam outlet. The steam inlet and steam outlet are both generally vertically oriented at the upper region of the steam separator. By providing both a steam inlet and a steam outlet in the upper region of the steam separator, the steam separator forces the steam to reverse its direction of travel as it moves through the interior. Reversing the direction of the steam effectively removes any entrained water droplets from the steam by gravity and thus increases the purity of the distillate condensed from the steam. Furthermore, by removing entrained water from the stream, greater control is realized over the steam's temperature.

According to still another aspect of the present invention, a water distilling apparatus comprises at least one steam generating tank which contains heated water therein and generates steam, at least one tube positioned along and in fluid communication with a respective steam generating tank, and at least one capacitive sensor. The tube is configured to contain water within an interior of the tube. The capacitive water level sensor is positioned along an exterior of the tube and includes a sensing circuit which senses the capacitance within the tube at the capacitive water level sensor. The sensing circuit is operable to output a signal indicative of a level of the water in the tube at the capacitive water level sensor in response to the sensed capacitance.

In one form, the water level sensor comprises a first capacitive surface and a second capacitive surface. The second capacitive surface is spaced apart and generally across from the first capacitive surface. The two capacitive surfaces are positioned such that the tank water will occupy at least part of the space between the two capacitive surfaces when the water level exceeds a certain depth. A sensing circuit senses the capacitance between the first and second capacitive surfaces and outputs a signal corresponding to the sensed capacitance.

According to another aspect of the present invention, a method for sensing the level of water in a tank of a distilling apparatus comprises providing a first capacitive surface and a second capacitive surface spaced away and apart from the first capacitive surface. The first and second capacitive surfaces are positioned in a location such that the capacitance between the first and second capacitive surfaces changes based on the level of water in the tank. The capacitance is sensed between the first and second capacitive surfaces and a signal is generated corresponding to the sensed capacitance.

According to yet another aspect of the present invention, a water distiller comprises a tank for holding and heating water and a condenser. The water distiller further comprises a capacitive sensor for sensing the level of water in the tank and a controller which controls the amount of water entering the tank based on the output of the capacitive sensor.

According to yet another aspect of the present invention, a multiple effect distillation system comprises a boiler for receiving raw water fed from a water source and for boiling the raw water to generate steam, at least two distilling chambers, and a water level control system for each of the distilling chambers. Each of the distilling chambers includes a water chamber and a condenser. The water chambers receive heated water and the condensers receive steam from one of the boiler and an adjacent distilling chamber. The condensers condense the steam to distillate, while the water chambers generate steam. Each of the water level control systems comprises a feedwater valve for controlling the amount of heated water received by the water chamber, a water level sensor operable to sense a water level in the water chamber, and a controller electrically connected to the water level sensor and the feedwater valve. Each of the controllers is operable to adjust the respective feedwater valve in response to the sensor independently of the other of the controllers.

According to yet another aspect of the present invention, a multiple-effect water distiller comprises a first and second tank for holding and heating water, and at least one condenser. A first sensor senses the water level in the first tank and a second sensor senses the water level in the second tank. A first control circuit controls the amount of water entering the first tank based on the output of the first sensor. A second control circuit controls the amount of water entering the second tank based on the output of the second sensor. The first and second sensors are independent from each other such that either of the first and second circuits can be replaced without replacing the other.

According to other aspects of the present invention, the water level sensor may be located around the exterior of a sight tube, which is in fluid communication with the tank of water. When the water level sensor is a capacitive sensor, it may include a conductor positioned between first and second capacitive surfaces of the capacitive sensor. The conductor may be a metal wire positioned in the water and it may be electrically coupled to ground. The control circuit that controls the flow of water to the tank may include an oscillator that sends an oscillating signal to one of the capacitive surfaces.

According to another aspect of the present invention, a distiller comprises a frame, a feed water source and a main controller carried by the frame. A boiler and a plurality of distilling units are also carried by the frame. Each distilling unit includes a distilling chamber, a feed water valve in fluid communication with the feed water source, and a water level sensor operably connected to the distilling chamber. Each distilling unit also includes a distilling chamber controller electrically connected to the water level sensor. The utilization of a distilling chamber controller with each distilling unit greatly facilitates the identification and rectification of a malfunction, as each distilling chamber controller may be separately removed and replaced without replacing the main controller.

According to still yet another aspect of the present invention, a distiller comprises a frame, a boiler, a main controller, and a plurality of distilling units carried by the frame. Each distilling unit includes a chamber, a heat exchanger positioned in the interior of the chamber, a steam separator carried by, and exterior to, the chamber, and a distillate tube positioned in the bottom region of the chamber and in fluid communication with the chamber of an adjacent distilling unit. A gas tube is located in the top region of each chamber and communicates with the chamber of the adjacent distilling unit to provide for the transfer of volatile gases between successive chambers. Each distilling unit includes an individual distilling unit control system for independently controlling the water level within the respective unit or chamber. A final condensing chamber is in fluid communication with at least one of the distilling units and a volatile separation assembly is in fluid communication with the final condensing chamber. The configuration of the distiller greatly increases efficiency and reliability of the distillation process. Additionally, the use of a plurality of distilling unit control systems simplifies maintenance and facilitates the identification of a malfunction.

According to another aspect of the present invention, a distiller comprises a frame, which supports a plurality of independent distilling chambers, and a boiler. The frame includes a side, while the distilling chambers are positioned in adjacent relationship, with each distilling chamber being accessible from the side of the frame. Each distilling chamber includes a condensing assembly and a bottom region, and is configured to collect distillate in the bottom region. A plurality of distillate transfer tubes transfer the distillate from the bottom region of one distilling chamber to the bottom region of an adjacent distilling chamber. The use of independent distilling chambers carried by the frame greatly facilitates repair and maintenance of the distiller, as each particular chamber may be individually accessed or removed, and does not require the disassembly of the entire distiller. Utilization of a plurality of independent distilling chambers, each of which may be accessed from one side of the frame, greatly increases the ease with which maintenance may be conducted. Moreover, because the distilling chambers may be accessed from one side of the frame, the distiller of the present invention may be used in applications where the distiller is placed in the corner of a room or a building or the like, such as a supermarket or retailer. Also, the distiller of the present invention does not require maintenance access at or through at least two sides of the unit, which makes the distiller particularly suited for applications where the unit may be positioned in a corner of a room or the like. The ability to conveniently place the distiller in a corner represents a great advantage to retailers as it maximizes the effective utilization of space.

The various aspects of the water level sensors of the present invention provide various improvements over the prior art. The drain chamber of the present invention functions to draw volatile gases to the drain chamber via a carefully controlled vacuum created by incorporating several processes within the drain chamber, and functions to cool the volatiles and blowdown water with cooling water which is separated from the volatiles and blowdown water, such that the cooling water may be recycled. Also, the capacitive water level sensor of the present invention does not have to be in direct contact with the boiling water in the water tank, which eliminates the possibility of the sensor becoming coated or damaged by substances contained in the boiling water. The use of a capacitive sensor also avoids the problem of varying conductivity of water from different parts of the world. Further, the capacitive sensor does not require a seal or insulator like a prior art conductivity sensor because it does not need to physically pass through the wall of the tube or chamber containing the water or steam. Additionally, by controlling each sensor in a multiple-stage or multiple-effect distiller via a locally positioned control circuit, the wiring for the distiller is greatly simplified. Such local control also simplifies troubleshooting by allowing an individual control circuit to be replaced without having to replace other control circuits. Furthermore, the individual control circuits can be replaced with the machine still running, thus eliminating the downtime required for cool down and startup of the distiller.

These and other objects, advantages, results, purposes and features of the present invention will be apparent to one skilled in the art, upon review of the following specification in conjunction with the accompanying drawings.

BRIEF DESCRIPTION OF THE DRAWINGS

FIG. 4 is an exploded perspective view of the boiler unit;

FIG. 5 is an exploded perspective view of one of the distillation chambers;

FIGS. 6A and 6B are perspective views of a bundle or pipe assembly useful with the distillation chamber of FIG. 5;

FIG. 8 is an exploded perspective view of the final condenser of FIG. 7;

FIG. 9 is an exploded perspective view of the volatile separation chamber of FIG. 7;

FIG. 10 is an exploded perspective view of the distillate cooler of FIG. 7;

DESCRIPTION OF THE PREFERRED EMBODIMENTS

Figure 1:
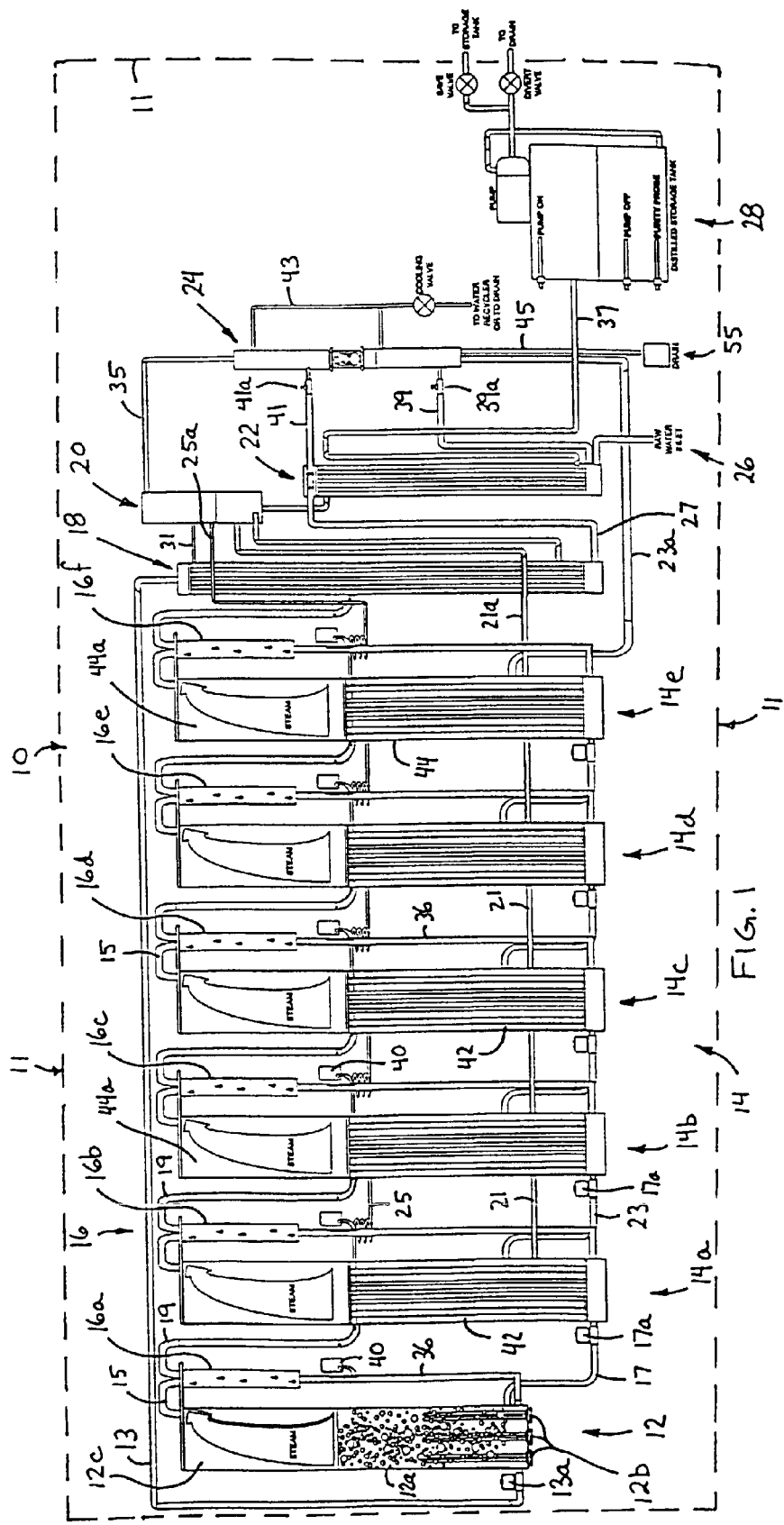
FIG. 1 is side elevation and partial sectional view of a multiple effect distillation system in accordance with the present invention.
Figure 2:
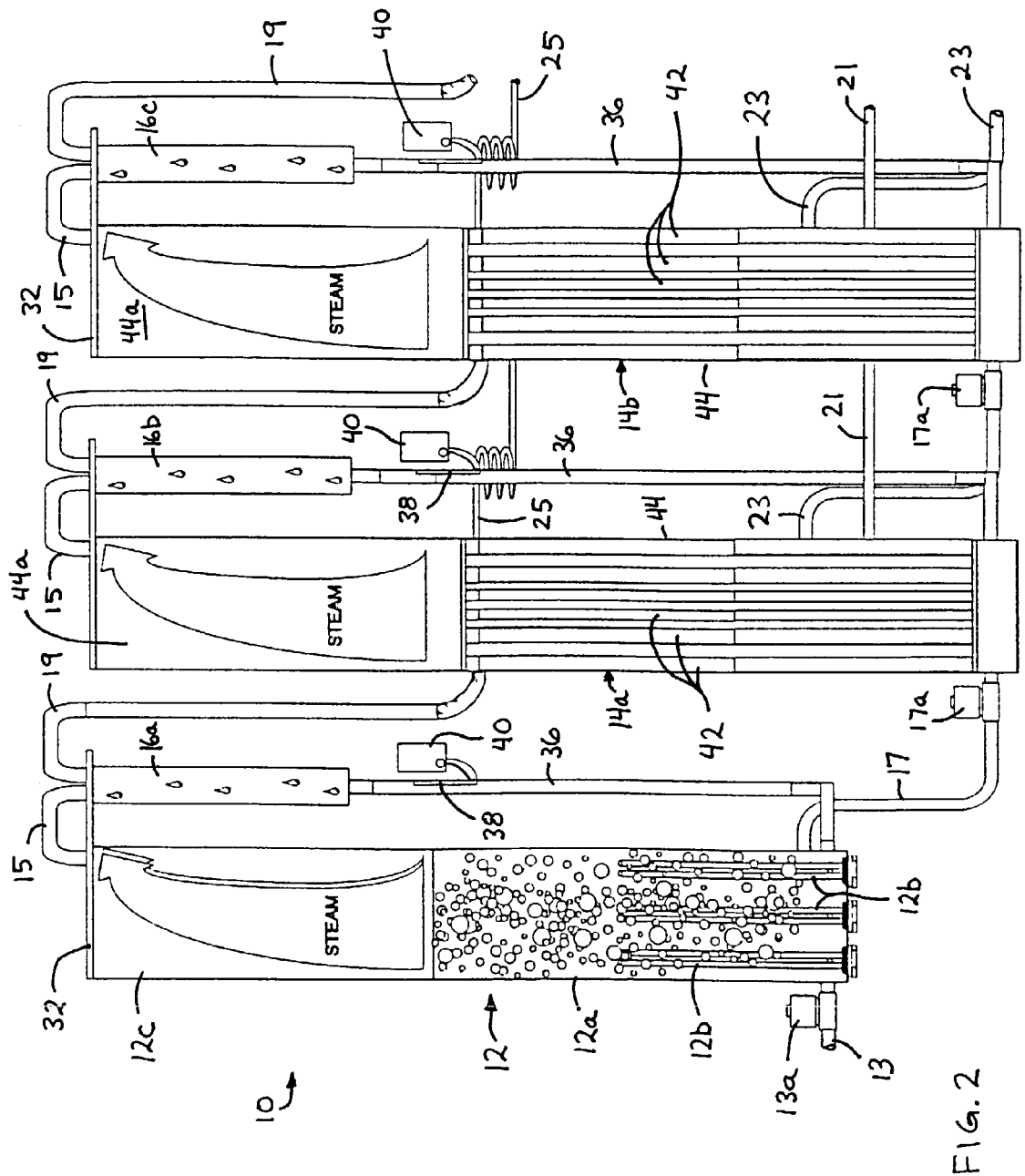
FIG. 2 is an enlarged side elevation and partial section view of a boiler unit, the first two distillation chambers and a steam separator of the distillation system of FIG. 1.
Figure 16:
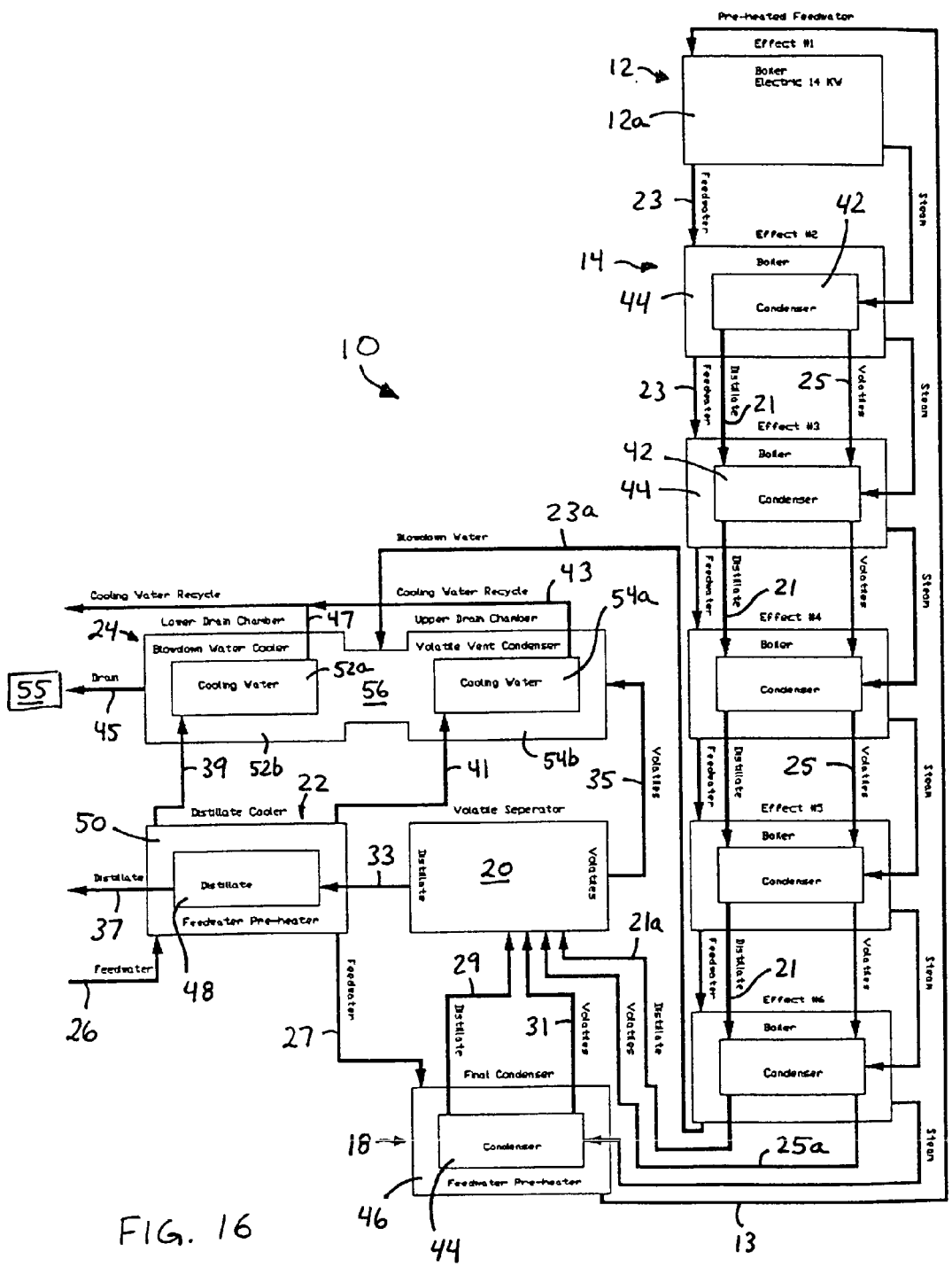
FIG. 16 is a block diagram of the water distillation system of FIG. 1, showing the flow directions of the steam, water and volatiles through the distillation system.

Referring now to the drawings and the illustrative embodiments depicted therein, a multiple effect water distillation system or unit 10 includes a boiler or boiling tank or chamber 12, a plurality of distillation or distilling chambers 14, and a plurality of steam separators 16 (FIGS. 1, 2 and 16). The boiling chamber 12 is operable to boil raw water to generate steam, while the steam separators 16 are operable to separate the steam from the water particles. The steam and boiling water are transferred from the boiling chamber 12 to each of the distillation chambers 14. In the illustrated embodiment, distillation system 10 includes five distillation chambers 14 (14a, 14b, 14c, 14d, 14e) and associated steam separators 16 (16b, 16c, 16d, 16e, 16f) in line with one another. However, more or less distillation chambers 14 and steam separators 16 may be implemented, without affecting the scope of the present invention. Distillation system 10 also includes a raw water preheating chamber and final condenser 18, a volatile separation chamber 20, a distillate cooler 22 and a drain chamber 24 positioned after a last distillation chamber 14e and associated steam separator 16f. Raw water is provided to the distillate cooler 22 at an inlet or input 26 and fed through the final condenser 18 to the boiling chamber 12, where the water is boiled to generate steam, as discussed below. The steam is fed through the steam separators 16 and distillation chambers 14 and condensed, and then fed to the final condenser 18 and/or volatile separation chamber 20 to obtain purified water or distillate, as also discussed below. The condensed distillate is transferred to a distillate storage tank 28 or the like for accumulation of the distillate and subsequent transfer of the distillate to a water storage tank or drain (not shown). The components of the water distillation system or unit are positioned within a housing or casing 11.

As shown in FIGS. 1, 2 and 4, boiling chamber 12 includes a tank or chamber 12a and at least one heating element 12b positioned within the tank for heating and boiling the raw water provided in the tank via an inlet line 13. As the water is boiled, steam (which may include water vapor, water droplets and volatile gases or other gases) is generated and flows upwardly into an upper portion 12c of boiling chamber 12. The steam exits via a steam transfer tube 15 from an upper end of the boiling chamber to steam separator 16a, while heated or boiling water also exits the boiling tank 12a at a lower end thereof via a transfer tube 17, which transfers the heated water to the first distillation chamber 14a. The water is provided to the first distillation chamber 14a at a slightly lower temperature than in boiling chamber 12, but is heated to a high enough temperature to boil and generate steam in chamber 14a via the steam from the boiling chamber 12, as discussed below.

As shown in FIG. 4, boiler chamber 12 also includes a drain tube 30 with a drain valve 30a extending downward from the lower end of the boiler tank 12a. The drain tube extends upward partially into boiling tank 12a and functions to drain the water out of the boiler tank 12a (when the drain valve 30a is opened) to empty the tank, such as when maintenance is required on the tank. Preferably, the drain valve 30a is openable by an extension tool (not shown) which may extend under the distillation unit or system 10 to facilitate opening and closing of the drain valve 30a by an operator who is remote from the drain valve 30a. This provides a safe means for draining the boiler tank by allowing the operator to drain the tank without coming close to or in contact with the boiling water being drained from the tank. The distillation unit or system may further include a drain pan (not shown) and/or drain hose (also not shown) for draining the water to a remote location from the distillation unit.

Boiling chamber 12 further includes an upper lid or cover 32 which covers the upper end of the boiling chamber and also covers the upper end of the steam separator 16a and connects or mounts the steam separator 16a to the boiler chamber 12. Steam transfer line 15 provides a steam transfer conduit at cover 32 between the boiling chamber 12 and the steam separator 16a. A steam separator 16 and cover 32 is also positioned at each of the multiple distillation chambers 14, as discussed below.

Figure 3:
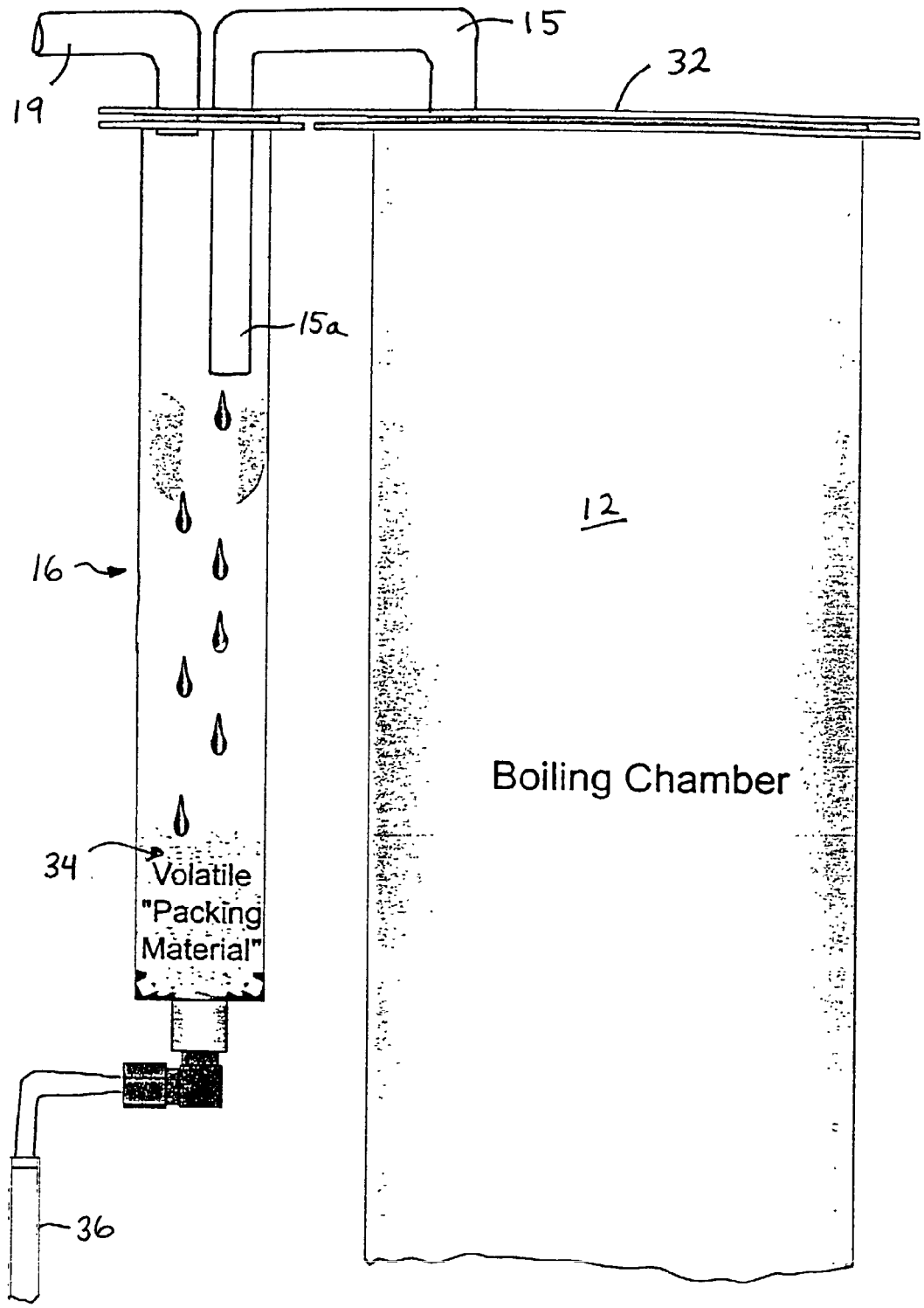
FIG. 3 is an enlarged side elevation and partial sectional view of an upper end of the boiler chamber and steam separator of FIGS. 1 and 2.

As best shown in FIG. 3, each of the steam separators 16 comprises a generally vertically oriented tube or cylindrical tank extending downward from cover 32. A discharge end 15a of steam transfer conduit 15 extends generally vertically through an upper end of the steam separator and further extends partially downward into the steam separator. A steam transfer tube 19 also inserts generally vertically through cover 32 and into or generally flush with the upper end portion of the steam separator. Steam separator 16 also includes volatile packing material or the like 34 at a lower portion thereof. Steam separator 16 receives steam from the steam conduit 15 and functions to reverse the flow of the steam via the vertically oriented tubes 15 and 19, such that the steam exits through steam transfer tube 19 and is transferred to the next distillation chamber 14. The volatile packing material 34 functions to receive droplets and particles carried by the steam as the steam reverses between the tubes 15 and 19 and minimizes any splash caused by the droplets hitting the lower portion of the steam separator 16. The droplets may be water particles carried by the steam or the like and are returned to the boiling tank via a tube or pipe or sight tube 36 connected at a lower end of the steam separator and in fluid communication with the boiling tank 12a.

Because the steam enters from the top of the steam separator 16 and must leave through the top as well, the steam is required to reverse direction, which is difficult for any entrained droplets to do, so that the droplets drop to the bottom of the steam separator. To further improve performance, the bottom portion of the separator may be filled with the stainless packing material 34 which gives the droplets something to cling to. The tube 36 and steam separator 16 assemblies are connected to the boiler or distillation chamber, which allows the separated droplets to reenter the same boiler or distillation chamber from which they came through the sight tube 36. This eliminates the need for an orifice or other flow control device to prevent steam loss from the separator drain.

Each of the multiple distillation chambers 14 are substantially similar to one another, such that only one will be described in detail herein. As can be seen with reference to FIGS. 1, 2, 5, 6A, 6B and 7, distillation chambers 14 include a plurality of condensing tubes 42 positioned within a tank or housing 44. The condensing tubes 42 receive steam from the boiling chamber or previous distillation chamber via transfer tube 19 and discharge the condensed water or distillate (which collects at the lower region of the tubes 42 as it condenses) via a discharge line 21, which connects a lower end of the condenser tubes 42 to the condenser tubes of the next distillation chamber. The distillation tank 44 receives heated raw water from an inlet line 17 from boiling chamber 12 or an inlet line 23 from a previous distillation chamber 14, as can be seen in FIGS. 1, 2 and 16, and discharges the water to the next distillation chamber via water line 23. Each distillation tank 44 is maintained at a lower pressure then the tank of the boiler tank 12a and/or the previous or upstream distillation tank. Although the raw water is provided to the distillation chamber at a slightly lowered temperature from the boiling chamber or previous distillation chamber, the steam within the tubes 42 heats and boils the water in the tank 44, such that steam is generated at each distillation tank 44, and rises upward through an upper portion 44a of tank 44. The lower pressure in each subsequent tank allows the water in the tank to boil at a lower temperature than in each previous or upstream tank. As the steam heats the water, the steam cools via heat transfer through the tubes and, thus, condenses into condensed water or distillate within the tubes 42.

Similar to boiling tank 12a, each distillation tank 44 preferably includes a drain tube 30 with a drain valve 30a (FIG. 5) extending downward from the lower end of the tank 44. The drain tube 30 extends upward partially into the tank 44 and functions to drain the water out of the distillation tank 44 (when the valve 30a is opened) to empty the tank, such as when maintenance is required on the tank. Preferably, the drain valve 30a is openable by an extension tool (not shown) which may extend under the distillation unit or system 10 to facilitate opening and closing of the drain valve 30a by an operator who is remote from the drain valve 30a. This provides a safe means for draining the distillation tank by allowing the operator to drain the tank without coming close to or in contact with the boiling or heated water being drained from the tank. The distillation unit or system may further include a drain pan (not shown) and/or drain hose (also not shown) for draining the water to a remote location from the distillation unit.

Also similar to boiling chamber 12, each of the distillation chambers 14 includes a cover 32 at an upper end thereof with a steam transfer line or tube 15 connecting the upper end of the distillation chamber to the associated steam separator 16 mounted to the cover 32. Because each boiling chamber and distillation chamber is a separate assembly from the other and has its own separate removable top plate, the individual tanks may be separately removed and maintained without affecting the other tanks of the distillation system.

Some volatile gases may condense at each effect of the multiple effect distillation system and be carried through the system with the distillate. The volatile and non-condensable gases that do not condense normally collect at the top of each condenser at each effect because they are lighter than the water vapor also contained in the condenser. These gases are transferred from one effect or chamber 14 to the next by a volatile gas line or tube or capillary tube 25. Preferably, the capillary tube is sized in length and diameter to allow only a specific volume of gas to pass through the tube. This prevents losses in efficiency caused by water vapor passing through the tube instead of condensing. All of the non-condensed gases and the condensed liquid or condensate end up in the volatile separation chamber 20 after passing from one effect to the next, as discussed below. The volatile gases are substances other than water that are able to follow the same path of vaporizing and condensing. In order to achieve higher purity distillate, these substances need to be separated and removed from the distilled water. Non-condensable gases, such as carbon dioxide and the like, may be produced or freed from the water during boiling and these gases need to be removed from the system as well.

Similar to boiling chamber 12, tank 44 of each distillation chamber 14 generates steam from the heated water within the tank. The steam travels upward through the upper portion 44a of the tank 44 and outward to a steam separator 16 via steam conduit 15. The steam separators 16b, 16c, 16d, 16e, 16f at the respective distillation chambers 14a, 14b, 14c, 14d, 14e are substantially identical to the steam separator 16a connected to the boiling chamber 12, such that a detailed discussion of the steam separators will not be repeated herein. Suffice it to say that each steam separator 16 is mounted to a respective distillation chamber 14 via the lid or cover 32, and is in fluid communication with the respective tank via a tube or pipe or sight tube 36.

Accordingly, as steam is generated by the boiling chamber and/or the distillation chambers, the steam is transferred to a steam separator and then further transferred to subsequent or downstream distillation chamber, where it is condensed in the condensing tubes of the downstream distillation chamber. Further steam is generated by the heated water within the downstream distillation chamber and is likewise conveyed to the next downstream distillation system in a similar manner.

As can be seen in FIGS. 1, 2, 7 and 13, sight tube 36 is connected between a lower end of each of the steam separators 16 and the lower end of the boiling chamber 12 or distillation chamber 14. The sight tube 36 extends generally vertically along the side of the tank or chamber such that the level of the water in the sight tube will be generally indicative of the level of the water within the respective boiling or distilling tank. A water level sensor 38 (FIGS. 1, 2, 7, 13 and 14) is positioned along each of the sight tubes 36 and operable to detect the level of water within the sight tube and thus, within the respective tank. Each of the boiling chambers preferably includes an individual, separate control module or circuit 40 positioned at the respective boiling chamber or distillation chamber. The control modules are independently operable to individually and separately control the water levels within the respective tanks via respective solenoids 13a, 17a at inlet lines 13, 17, and in response to a respective water level sensors 38. Preferably, the sight tube is a plastic tubing. In a preferred embodiment, sensor 38 is a capacitive sensor, as discussed in detail below.

Each control module 40 is connected to a respective sensor 38 and is operable to control the amount of water entering the respective tank. For example, a control module 40 is connected to sensor 38 at sight tube 36 of boiling chamber 12 and is operable to control a solenoid 13a at inlet line 13 to control the water flow into the boiling tank 12a and thus to control the water level within the boiling tank 12a. Likewise, each control module 40 at the distillation chambers 14 is operable to control a solenoid 17a at the transfer tube 17 supplying heated water to the respective distillation chamber 14. The sensors 38 are operable to determine when the water levels in the respective tanks drop to a low level, such that the corresponding control module or circuit 40 may then open the appropriate solenoid 13a, 17a to allow additional water to enter the respective tank. Optionally, the control module 40 at the boiling chamber 12 may be further operable to deactivate the heating element or elements 12b if the water level in boiling tank 12a drops too low. The heating elements may be deactivated in such a manner in response to a separate sensor (not shown), such as one in the boiling tank, without affecting the scope of the present invention.

Preferably, each of the control modules 40 is operable independently from the other control modules. Also, preferably, the solenoid valves 13a, 17a are placed just inside a front portion of the distilling unit and on the outside of an insulation chamber (not shown) containing the boiler chamber and the distillation chambers. The solenoids thus can be easily accessed for service or replacement by removing only the front panel or panels (also not shown) of the housing 11 of the distillation unit 10. The valves may be connected to the piping with easily removable compression fittings and to the electrical control with a quick connect plug to further ease in service and maintenance.

Figure 13:
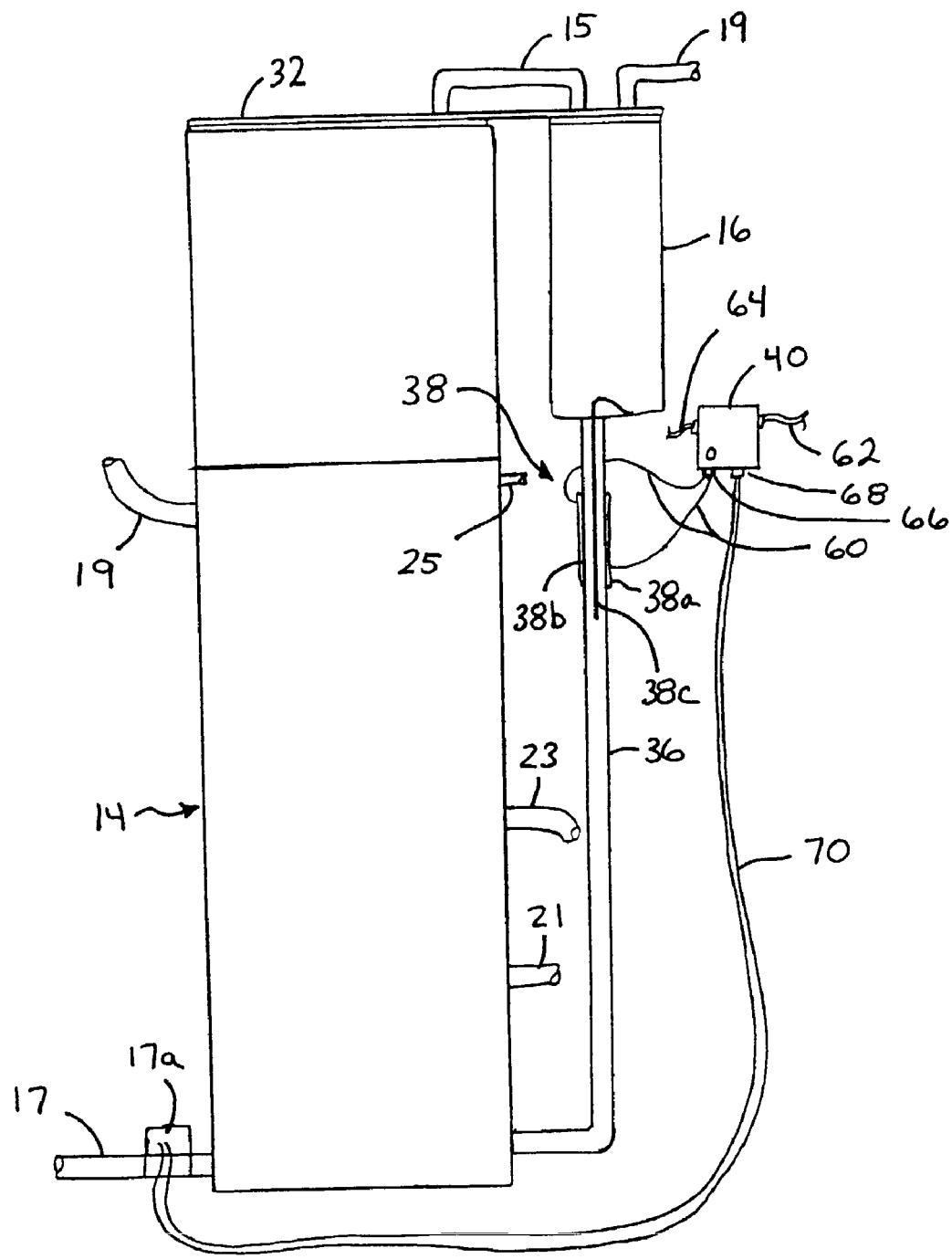
FIG. 13 is a side elevation of a distillation chamber with a capacitive sensor on a sight tube in accordance with the present invention.
Figure 14:
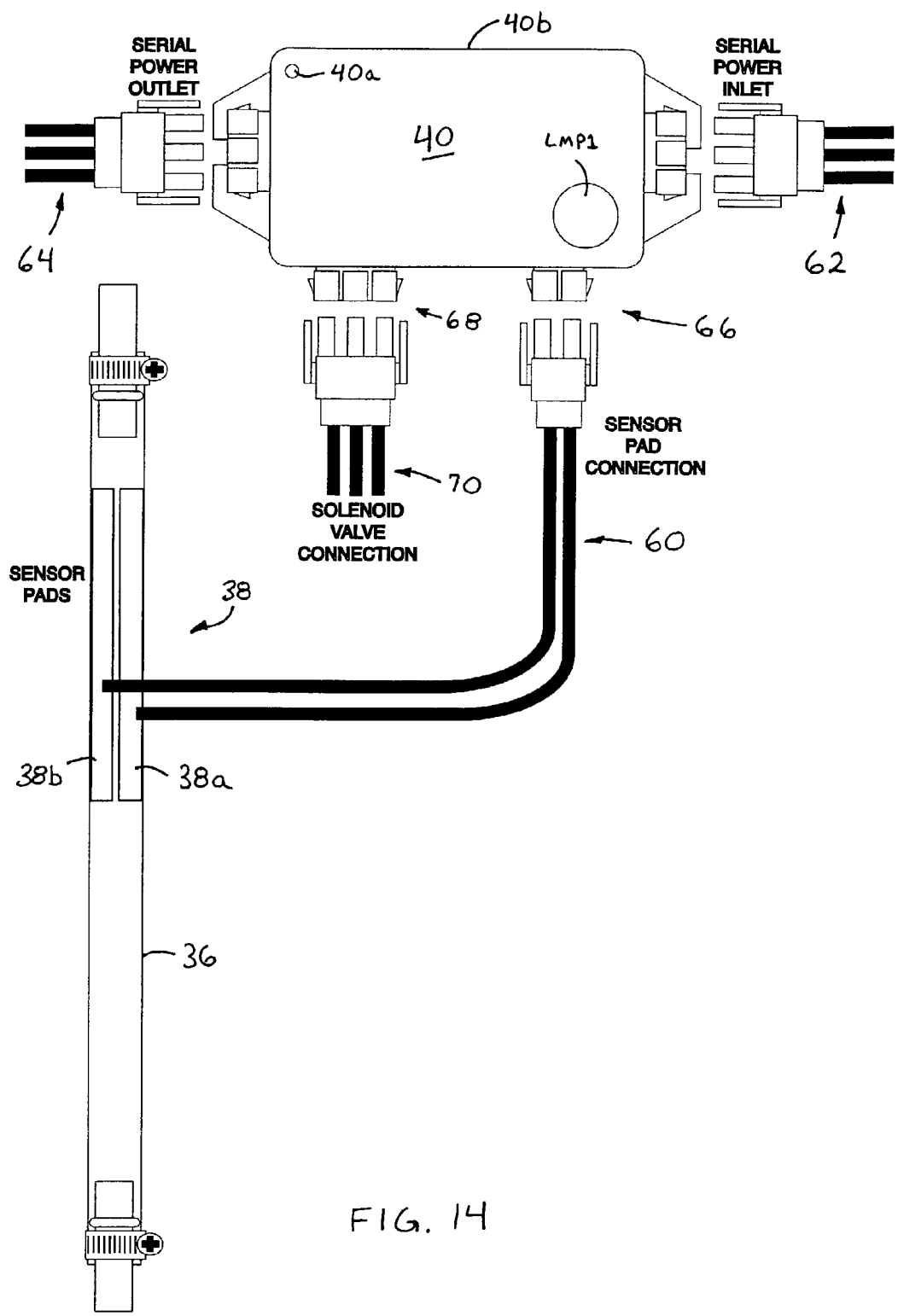
FIG. 14 is an enlarged side elevation of a control module and capacitive sensor in accordance with the present invention.
Figure 15:
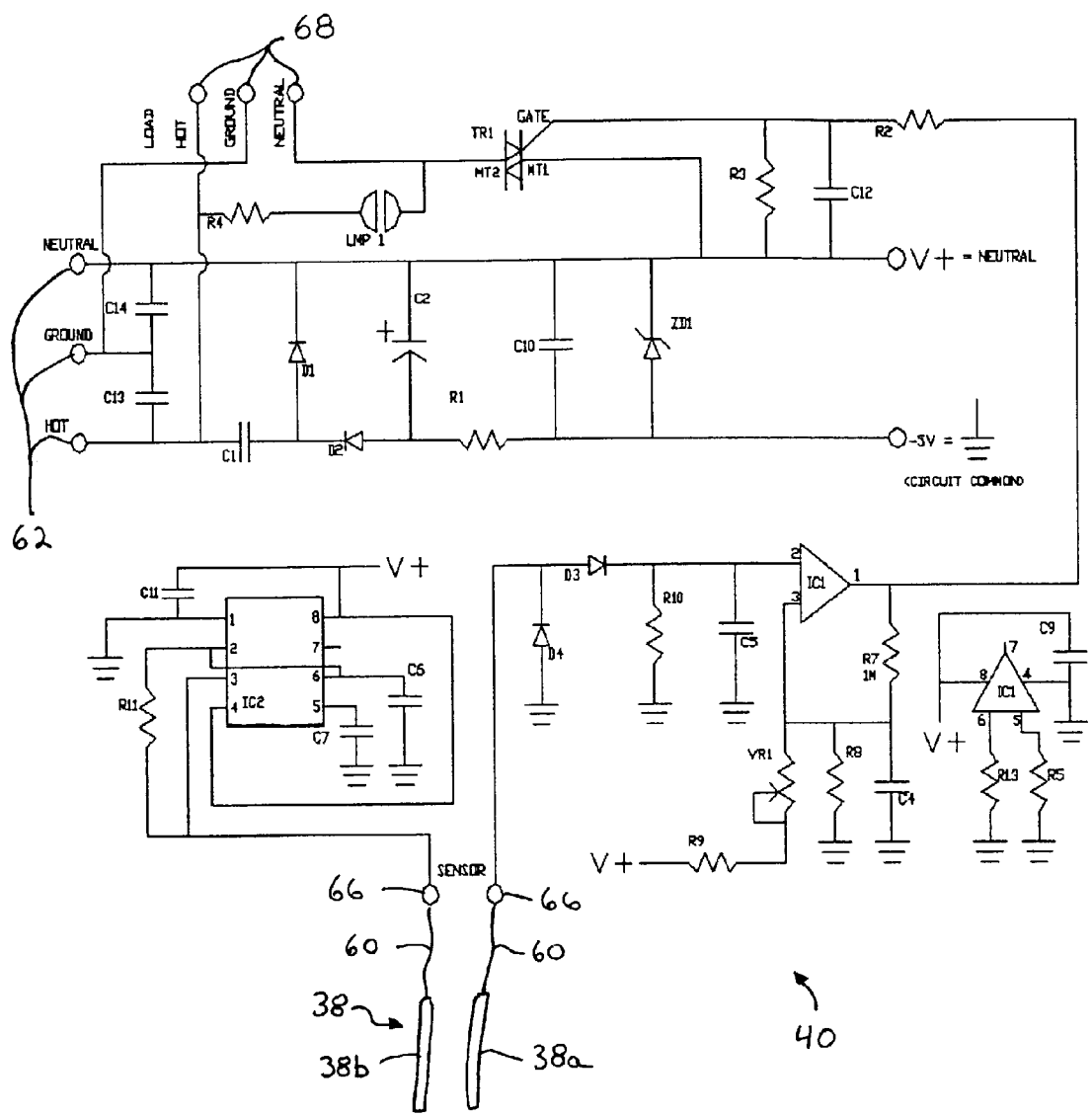
FIG. 15 is a circuit diagram of a water level control circuit useful with the capacitive sensor of FIGS. 13 and 14.

In a preferred embodiment, water level sensor 38 is a capacitive sensor which measures the level of water by measuring changes in capacitance. As best shown in FIGS. 13-15, water level sensor 38 comprises a pair of capacitive plates 38a, 38b which are spaced apart and generally across from each other. Capacitive plates 38a, 38b are preferably positioned around the exterior of sight tube 36. Apart from the material of the sight tube, which is plastic or the like, capacitive plates 38a, 38b are separated by either of three media: water, air, or steam, depending on the level of water in the tank and sight tube and whether or not any steam has entered sight tube 36. These three media act as dielectrics between capacitive plates 38a, 38b. The capacitance between plates 38a, 38b varies as a function of these three media and their relative proportion to each other. By detecting the capacitance between plates 38a, 38b, and predetermining the amount of capacitance at a number of known water levels, sensor 38 determines the level of water in the tank connected to the respective sight tube. The capacitive field sensors are positioned on the exterior surface of the sight tube and thus do not require the sensing elements to be in direct contact with the boiling water of the distillation system. This eliminates the possibility of the sensing element becoming coated or damaged by substances contained in the boiling water.

Plates 38a, 38b of sensor 38 have a length which is sufficiently long to measure the various water levels that are expected during the distillation process. If the water level drops below the lowermost edges of plates 38a, 38b or exceeds the uppermost edges of plates 38a, 38b, sensor 38 may not be able to properly measure variations in water levels. Therefore, sensor 38 is preferably sufficiently long and placed at a height along sight tube 36 such that plates 38a, 38b will partially envelop at least some water in sight tube 36 at substantially all times at which the level of water is to be monitored.

In the illustrated embodiment of FIG. 13, sensor 38 further includes a conductor 38c disposed between capacitive plates 38a, 38b. Conductor 38c may be a metal wire or any other type of conductive material, without affecting the scope of the present invention. Conductor 38c is electrically coupled to ground, such as by electrically coupling one end of the wire to the respective steam separator 16 (as shown in FIG. 13) or to the respective water tank 12a or 44, if the water tank is made of metal. It has been found that the presence of conductor 38c in sensor 38 helps remove differences in capacitance associated with the varying levels of minerals in the water as the water is boiled. Conductor 38c is preferably positioned inside the sight tube 36 where it is in direct contact with the water.

As best shown in FIGS. 13 and 14, each sensor 38 includes two wires 60 which are electrically coupled at one end to the capacitive plates 38a, 38b and electrically coupled at the other end to a pair of terminals 66 at a respective control circuit or module 40. Control circuit 40 takes the raw electrical signals from wires 60 and uses them to control solenoid valve 13a, 17a, which determines the amount of water entering the water tank. Control circuit 40 includes a power input terminal or connector 62, a power output terminal or connector 64, a sensor terminal or connector 66, and a valve terminal or connector 68. Power input 62 receives the power which powers control circuit 40. In the current embodiment, control circuit 40 is powered by 120 volts AC. Other types of power could of course be used within the scope of the present invention. Power output 64 is directly coupled to the power input 62 and provides power to the power input terminal 62 of an adjacent control circuit or module if the distiller is a multiple stage distiller. Sensor terminal 66 outputs an electrical signal to one of capacitive plates 38a, 38b and receives a signal back from the other one of capacitive plates 38a, 38b via wires 60. Valve terminal 68 electrically communicates with the solenoid valve 13a, 17a that controls the amount of water entering the boiling or distillation tank via wires 70.

Each control circuit or module 40 is positioned adjacent to the respective water tank and is independent from any other control circuits in the distillation system. The positioning of control circuit 40 adjacent to the water tank (and thus adjacent to or near the water level sensor and solenoid) simplifies the wiring that otherwise would be needed if control circuit 40 were positioned inside a master control box located in the distillation unit remote from at least some of the boiling or distillation chambers. The independence of control circuit 40 from other circuits allows it to be replaced without replacing other control circuits. For example, if the distiller is a multiple-stage distiller and there are at least two control circuits 40, either one of these can be replaced without replacing the other.

An electrical schematic of control circuit 40 is depicted in FIG. 15. The power input terminal 62 is coupled to capacitors C13 and C14, which serve to reduce line noise from effecting the operation of control circuit 40. Components C1, D1, D2, C2, R1, C10, and ZD1 comprise a power supply that reduces the 120 volt AC power input to −5 volts DC to operate the control circuit. Components IC2, C11, C6, C7, and R11 make up an oscillator circuit centered around a 555 timer IC. R11 can be a potentiometer to allow for adjusting the frequency of the oscillator. The signal from the oscillator is applied to one of capacitive plates 38a, 38b via the connector or terminal 66 and one of the wires 60. This oscillating signal induces an oscillating signal on the other of the two capacitive plates 38a, 38b which is dependent on the capacitance value of the sensor 38. The capacitive value of sensor 38 is dependent upon which dielectric is present between the two capacitive plates 38a, 38b, and in what amount.

The oscillating signal induced on the second of the two capacitive plates 38a, 38b produces a voltage which operates a charge pump consisting of components D4 and D3. The charge is stored in C5 and is constantly discharged at a set rate through R10. The voltage at C5 is applied to a pin 2 of a comparator IC1. Comparator IC1 compares this voltage to a reference voltage applied to a pin 3 of comparator IC1. When the voltage applied to pin 2 of comparator IC1 crosses over the voltage at pin 3 of comparator IC1 (which is a preset voltage), then the output voltage from the comparator IC1 at pin 1 reverses. Resistor R9 and variable resistor VR1 provide the present voltage to pin 3 of comparator IC1. Variable resistor VR1 can be adjusted to provide a wide range of voltages to pin 3 which will control at what point the voltage at pin 2 crosses over and reverses the output from comparator IC1 at pin 1. When the output of comparator IC1 reverses at pin 1, it activates or deactivates the triac TRI, which in turn activates or deactivates the lamp LMP1 and the control valve for the water tank, which is electrically coupled to terminals 68 via wires 70. Capacitors C4, C9 and resistor R8 are for noise suppression. Resistor R7 provides a hysteresis to prevent rapid reversing of the output at pin 1. Resistors R2 and R4 are current limiting resistors and resistor R3 and capacitor C12 are for noise suppression. The calibration of the control circuit may be adjusted via access of an adjustment or calibration control via an opening or aperture 40a in a housing 40b of the control module 40 (FIG. 14). The lamp LMP1 may be viewable at an exterior of the housing 40b to indicate that a low water level has been detected and that the solenoid valve is being opened.

Because each boiling chamber or distillation chamber has its own separate control circuit or module, the distillation system of the present invention provides for reduced wiring of the controls and sensors of the system. Because the sensor control module controls the valve at the respective tank, there is no need for the sensor wires and the valve wires to run all the way back to a main control box (not shown). Wiring the control section of the machine is thus simplified by plugging in the pre-assembled cords to the sensor control modules at each respective boiler or distillation chamber. Additionally, the separate control modules greatly simplify trouble shooting and reduce replacement costs to the distillation system of the present invention. The control module or circuit for each boiler level or effect or chamber will be located at that effect, so determining which sensor control module controls which valve will be a simple process. Also, if one control module goes bad and requires replacement, it will not require replacement of an entire circuit board. Only the faulty control module will need to be replaced, which may easily be done by unplugging the control module and replacing it with a new one. This can be accomplished without shutting down the machine, since it can be done in only a few seconds while the distillation system is operating.

Figure 7:
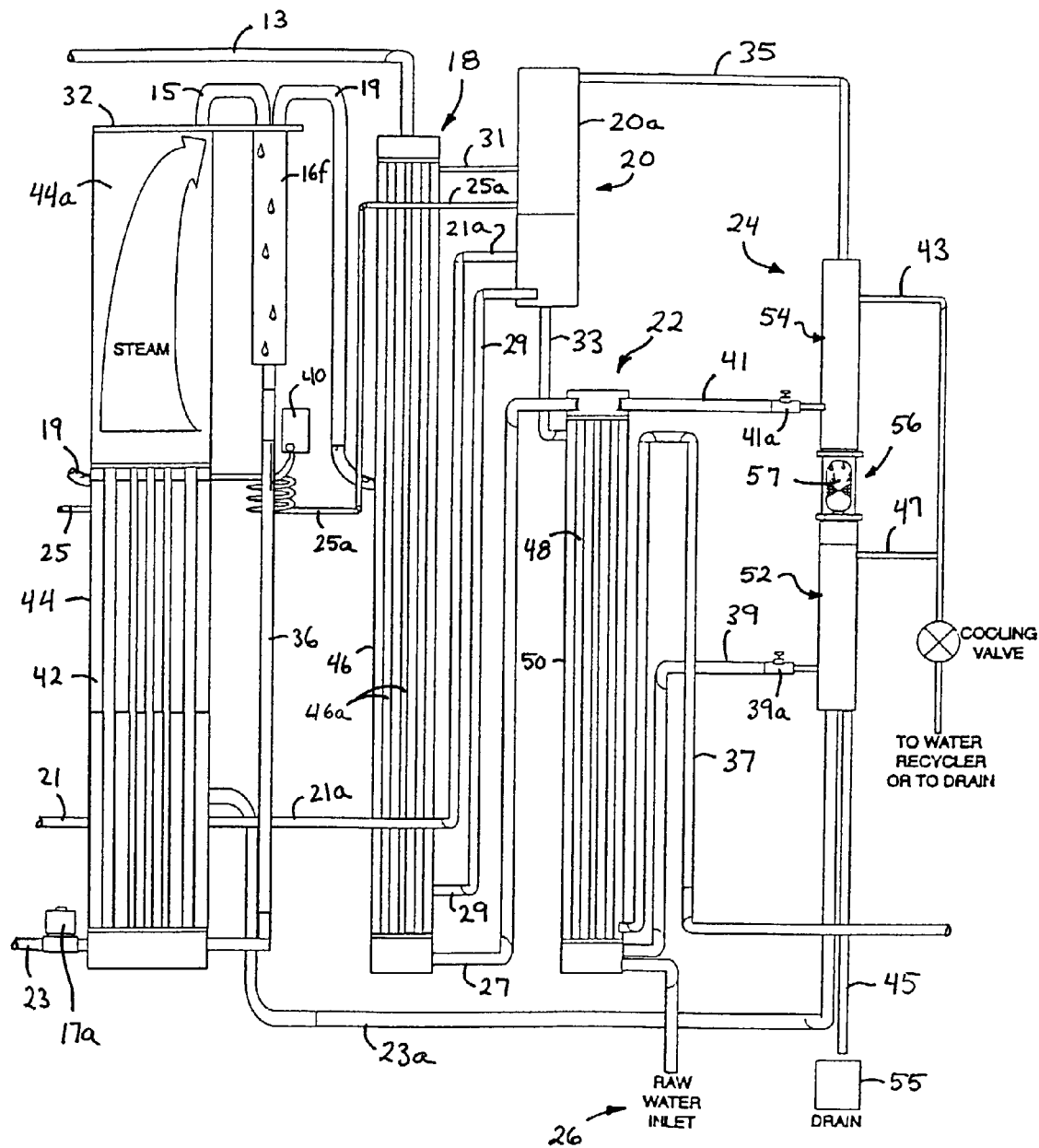
FIG. 7 is an enlarged side elevation and partial sectional view of the final distillation chamber, final condenser, distillate cooler, volatile separation chamber and drain chamber of the distillation system of FIG. 1.

As shown in FIGS. 1, 7 and 16, after or downstream from the last distillation chamber or effect 14e, distillation system 10 includes a final condenser 18. As shown in FIGS. 7 and 8, final condenser 18 includes a plurality of condensing tubes 46a positioned within a shell or housing or tank 46. The condensing tubes 46a receive steam from the steam separator 16f of the last distillation chamber 14e via steam transfer tube 19. The tank or shell 46 receives raw inlet water at one end via an inlet line 27. The raw inlet water functions to cool the steam within the condenser tubes 46a, thereby condensing the steam into distillate, which is then discharged at a lower end of the final condenser via a discharge tube 29. In the illustrated embodiment, the raw water provided to the tank 46 is warmed or increased in temperature via heat transfer during the cooling process of the steam within the condenser tubes 46a. The warmed water is then transferred to the inlet of the boiling chamber 12 via inlet water line 13.

Similar to the distillation chamber 14, final condenser 18 provides a volatile gas discharge line or capillary tube 31 at an upper end thereof for discharging volatile gases from the condenser tubes 46a to the volatile separation chamber 20. As also shown in FIGS. 1 and 7, a volatile gas line or capillary tube 25a from the final distillation chamber 14e transfers the volatile gases from the distillation chambers to the volatile separation chamber 20 as well. Also, the condensed water or distillate from the final distillation chamber 14e is transferred to the volatile separation chamber 20 via a water transfer line 21a.

Volatile separation chamber 20 receives the distillate from the final condenser 18 and from the final distillation chamber 14e, and also receives the volatile gases from the final condenser 18 and final distillation chamber 14e. The volatile separation chamber 20 comprises a generally cylindrical tube or cylindrical tank 20a which is substantially filled with a stainless steel packing material or the like 20b (FIG. 9) which functions to spread the volatile gases and condensed liquid out over a very large surface area. The volatile chamber is preferably maintained at approximately at 200-212 degrees Fahrenheit by the hot condensed liquids and the non-condensed gases entering the chamber. The combination of the high temperature and the increased surface area allows the volatile gases and/or other gases that may have condensed in the previous effects or chambers to again change to a vapor state and rise toward the top of the volatile separation chamber 20. The purified or treated distillate passes down through the packing material 20b and is discharged from the bottom of the volatile separation chamber 20 via a fluid line 33. The volatile and non-condensable gases which rise to the top of the volatile chamber are then drawn off through a discharge tube 35 connected to drain chamber 24, as discussed below.

The distillate discharged from the bottom of the volatile separation chamber 20 is discharged into the distillate cooler 22, which functions as a heat exchanger to cool the distillate and to correspondingly warm or preheat the raw water from the water source 26. As can be seen with reference to FIGS. 1, 7 and 10, distillate cooler 22 includes a plurality of tubes 48 positioned within a tank or housing or chamber 50. The tank 50 of distillate cooler 22 receives raw inlet water from the water supply 26, which flows around the between the tubes 48 and functions to cool the distillate within the tubes 48 of the distillate cooler 22. The raw water is warmed or increased in temperature via heat transfer during the cooling process of the distillate within the tubes 48. The warmed water is then discharged from the distillate cooler 22 to the inlet of the final condenser 18 via fluid line 27, where it is further warmed, as discussed above. The distillate cooler and final condenser thus function to warm or preheat the raw water to an elevated temperature prior to the water being inducted into the boiling chamber 12.

The tubes 48 of distillate cooler 22 discharge the cooled distillate to storage tank 28 or the like via a distillate discharge tube 37. Preferably, the raw, unwarmed water from the water supply 26 is also provided to a lower chamber 52 of drain chamber 24 via a fluid line 39, while the warmed, raw water at the discharge end of the distillate cooler 22 is provided to an upper chamber 54 of drain chamber 24 via a fluid line 41.

Drain chamber 24 functions to collect and cool the volatile gases and the like from the volatile separation chamber 20 and to discharge the cooled volatiles to a drain 55. Drain chamber 24 is operable to create a vacuum at gas line 35 to draw the volatiles from the volatile separate chamber 20 and into the drain chamber 24. The vacuum or suction is created in a controlled manner by cooling and thus condensing or collapsing the steam and/or gases within the drain chamber via the cooling water and by providing blowdown water to the drain chamber to assist in partially blocking the drain line 45 of the drain chamber, as discussed below. The volatiles are drawn in at or near steam temperature and are then cooled and condensed or collapsed by flowing cooling water around tubes containing the volatiles as discussed below. The cooling water is thus separated from and not mixed with the volatiles, such that the cooling water may be recycled and reused.

Figure 11:
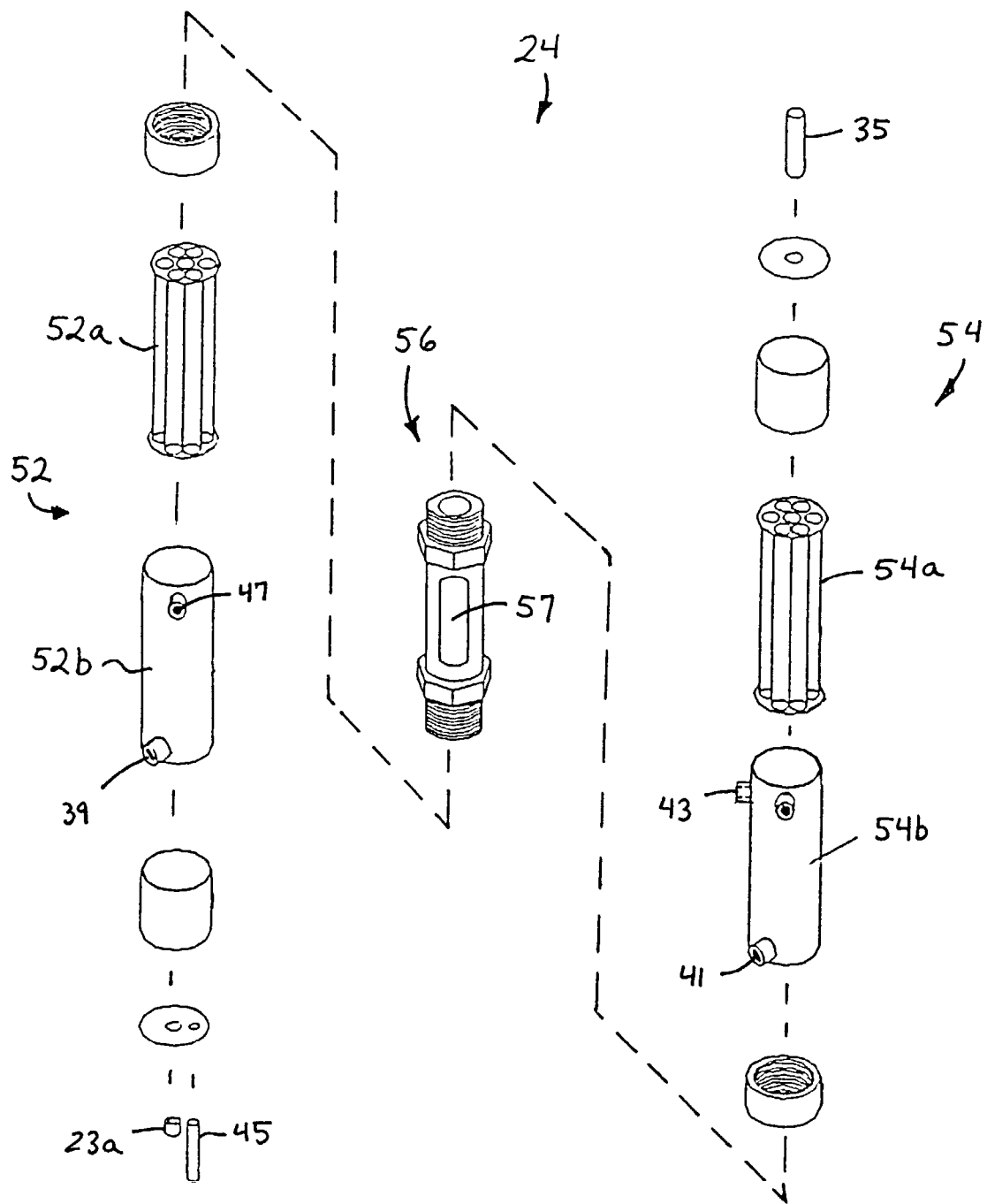
FIG. 11 is an exploded perspective view of the drain chamber of FIG. 7.
Figure 12:
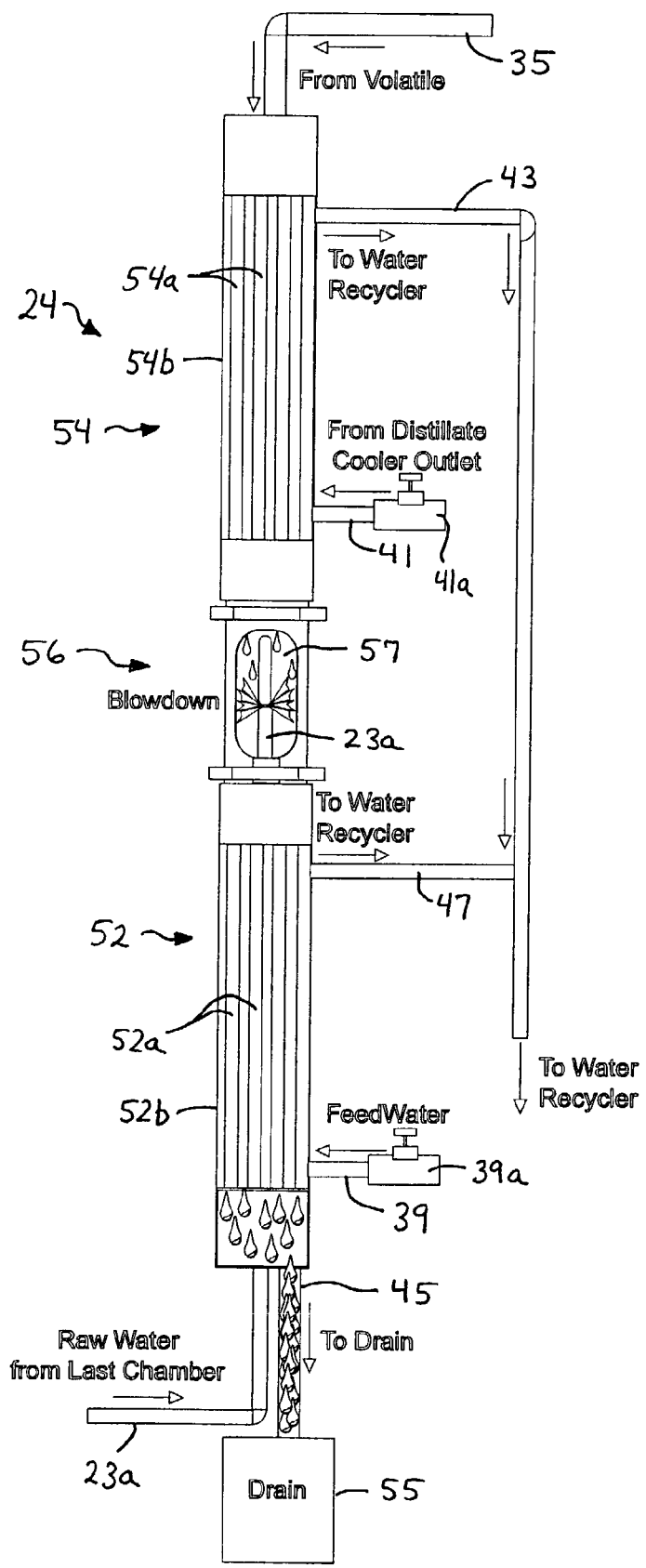
FIG. 12 is a side elevation and partial sectional view of the drain chamber of FIGS. 7 and 11.

As shown in FIGS. 11 and 12, upper portion 54 of drain chamber 24 includes a plurality of tubes 54a positioned within a gas and steam cooling and condensing portion or cooling water portion or tank or housing or chamber 54b. The tubes 54a receive the volatile gases and the like from volatile chamber 20 via volatile gas line 35. The tank 54b receives raw water from the distillate cooler outlet line 41 and discharges the raw water to a water recycler or drain (not shown) via a discharge line 43. The water from the distillate cooler outlet line 41 functions to cool the tubes 54a, and thus, to cool the volatile gases within the tubes 54a. The cooling line 41 may include a valve 41a, which may be adjusted to adjust the flow rate of the cooling water in line 41 and, thus, to adjust the temperature within the upper portion 54 of the drain chamber 24. The cooling water is received in the tank 54b and is separated from the volatiles in the tubes 54a via the walls of the tubes, such that cooling is accomplished without mixing the raw water with the volatile gases. The raw cooling water may thus be recycled and used as the water supply for the distillation system. The tube and shell heat exchanger of the upper portion 54 of drain chamber 24 thus cools and condenses some of the volatile gases and steam within the tubes, which functions to create a slight vacuum in the tubes of the drain chamber, which further assists in drawing volatile gases into the drain chamber from the top of the volatile gas separating chamber 20 via volatile gas line 35. The adjustment of the flow rate of the cooling water and temperature within the tank 54b also assists in controlling the cooling rate of the steam and/or gases within the tubes and, thus, assists in controlling the vacuum or suction created by the drain chamber.

Drain chamber 24 also includes a middle portion 56 between the lower and upper portions 52, 54. The middle portion 56 contains a heavy-duty sight glass assembly 57 for visual confirmation of expulsion of blowdown water. The blowdown water is a small amount of water released into the drain chamber from the last effect or distillation chamber 14e and may be concentrated, contaminated waste water from the distillation process and is not reusable as raw inlet water to the distillation system or unit. The blowdown water is provided to the middle portion 56 via a transfer tube or pipe 23a which extends from the tank of the distillation chamber 14e upward through the lower portion 52 of drain chamber 24 to the middle portion 56. Expulsion of the blowdown water from the last distillation chamber 14e helps to keep the concentration of contaminates in the boilers and distillation chambers at an acceptable level. The amount of blowdown water entering the drain chamber is mainly determined by the pressure in the final condenser or boiler 14e, which is controlled by the cooling water flow rate into the chamber. The blowdown water is received in the middle portion 56, whereby steam from the blowdown water may rise into the tubes 54a of upper portion 54, while the liquid may drop down into the tubes 52a of lower portion 52 and assist in partially blocking the drain line 45 to assist in creating and controlling the vacuum or suction created by drain chamber 24, as discussed below.

Similar to upper portion 54, lower portion 52 of drain chamber 24 includes a steam, gas or liquid condensing portion or a plurality of tubes 52a within a cooling water portion or shell or housing or chamber 52b, thus also providing a tube and shell heat exchanger within the lower portion 52. The shell 52b receives the unwarmed, raw water via water line 39 from the water source 26, whereby the unwarmed water cools the blowdown water and volatile gases to an acceptable level prior to the blowdown water, volatiles and gases being discharged from the tubes 52b of drain chamber 24 to the drain 55 via discharge line 45. The cooling of the blowdown water and steam or gases in the lower portion 52 also contributes to the slight vacuum created in the drain chamber 24 to assist in drawing or pulling the volatile gases from the volatile chamber 20 via gas line 35. The lower chamber 52 provides additional cooling of volatiles since the cooling water in the lower tank 52b is at a lower temperature than the cooling water in the upper tank 54b. The flow of the cooling water into lower portion 52 may also be adjusted via a valve 39a in water line 39 to control the flow rate of the cooling water and thus the temperature in the lower portion 52 of drain chamber 24. Similar to upper chamber 54, lower chamber 52 separates the cooling water in the tank 52b from the blowdown water, steam, volatile gases and/or other gases in the tubes 52a via the walls of the tubes, such that the cooling water is not mixed with the water, steam and/or gases in the lower chamber. The cooling water is then discharged from the lower chamber 52 via a discharge line 47, which may connect to discharge line 43 of upper chamber 54, such that the cooling water from both chambers may be recycled and reused.

Blowdown water from the center portion 56 and any condensed steam and volatile gases and/or other gases from the top portion 54 drop downward and may collect in the tubes 52a of bottom portion 52 of the drain chamber 24, where they are further cooled by the raw cooling water in shell 52b. The outlet or discharge line 45 of drain chamber 24 is selected to have a length and diameter which controls the amount of water exiting the drain chamber 24 while maintaining the discharge opening in the drain chamber partially blocked by the water. The partial blockage created by the downward flow of liquid and/or droplets exiting the drain chamber limits or substantially precludes the partial vacuum created in the drain chamber from drawing air up through the drain tube 45 instead of drawing gases in through the top of the drain chamber via the gas tube 35 from the volatile separation chamber 20. The addition of the blowdown water and steam into drain chamber 24 provides additional hot water and steam that contribute to the vacuum created within the condensing portions 52a, 52b of drain chamber 24. The amount of blowdown water entering the drain chamber is controlled to control the level of vacuum being generated. Accordingly, by providing and controlling the amount of blowdown water added to drain chamber 24, the present invention utilizes the liquid blowdown water to assist in partially blocking the drain tube 45 and thus may control or adjust the vacuum level via adjustment of the amount of blowdown water added to the drain chamber.

The diameter and length of the drain chamber outlet tube 45 is selected to be small enough to be at least partially blocked to allow the suction or vacuum to be created in the chamber, in order to enhance the purity of the distillate generated by the distillation system, as discussed above. If the opening is too small, however, too much suction or vacuum may be created, which may cause loss of steam and distillate from the volatile separating chamber (since the steam and/or distillate may be drawn through line or tube 35 to the drain chamber), which may reduce the overall production or output by the distillation system or unit. Because the outlet tube 45 is only partially blocked by the water flowing through it, large pressure fluctuations in the drain chamber 24 are avoided. Also, any pressure increase in the volatile separation chamber 20 may be vented out the drain opening of the drain chamber as necessary. This allows the non-condensable gases to be vented from the system.

Because the cooling of the volatile gases and blowdown water takes place in the heat exchanger tubes 54*a*, 52*a* of the drain chamber 24 and thus occurs through the walls of the heat exchangers, there is no cross contamination between the cooling water and the blowdown water and volatiles, such that the cooling water may be recycled and reused. Also, because the cooling of the volatiles in the upper portion of the drain chamber and the cooling of the volatiles and blowdown water in the lower portion of the drain chamber are controlled by two different cooling water flows, each of these flows can be set at a optimum setting without having to reach a compromise between blowdown discharge temperature, purity and production. The advantage of the two separate flows of cooling water is that the flow used to cool the blowdown water before it exits the distillation system can be increased to any level, which provides the distillation system with greater control over the temperature of water entering the customer's drainage system, without affecting the operation of the volatile removal system or of the final condenser, both of which are dependent on cooling water flow rates. This may be important in situations where a customer has plastic drainpipes or strict wastewater regulations. Because the cooling water is separated from the blowdown water and volatiles, such increased flow of the cooling water does not result in excessive waste of the water, since the water may be recycled.

Preferably, the distillation system 10 is operable to shutdown the distillation chambers 14 and boiling tank 12 when the storage tank 28 is full of distillate. Optionally, the distiller may be electrically connected to a tank float system in the storage tank. Alternately, the tank may have a mechanical float valve or a cord type float switch and solenoid combination to stop the flow of distillate from entering the tank. When the distillate flow is stopped, a pump pressure switch (not shown) will stop the pump and the distillation unit will shut down when the transfer tank is full.

Therefore, the present invention provides an efficient water distillation system which is operable to provide substantially pure water or distillate. The steam separator of the distillation system of the present invention provides a simplified and effective means for removing entrained droplets from the steam as the steam is discharged from each of the individual boiling chambers or distillation chambers. The sensors and control modules of the present invention are operable to control the level of water in the boiling tank or distillation tanks via capacitive type sensors which do not come in contact with the boiling water, yet provide effective means for determining the level of the water in the tank. The separate control circuits or modules provide for reduced wiring of the system and further provide for improved maintenance of the system by allowing a particular control module to be replaced without requiring shutting down of the distillation system.

Also, the drain chamber of the present invention provides an improved means for removing volatile gases and the like from the distillation system and for controlling the temperature of the discharged liquid and volatile gases and the like as they are discharged from the distillation system. The drain chamber creates a vacuum to assist in drawing or pulling the volatile gases from a volatile separation chamber, which enhances the purity of the distillate discharge from the distillation system. Also, the drain chamber of the present invention separates the volatile gases and blowdown water from the cooling water, such that the cooling water may be recycled and reused in the distillation system. Additionally, the drain chamber may receive cooling water from two separate sources to provide better control of the temperature of the discharged blowdown water and condensed volatiles and other gases and the like, without adversely effecting the flow rates through the condensers, boilers and other components of the distillation system.

Changes and modifications in the specifically described embodiments can be carried out without departing from the principles of the invention. Therefore, the present invention is intended to be limited only by the scope of the appended claims, as interpreted according to the principles of patent law, including the doctrine of equivalents.

The embodiments in which an exclusive property or privilege is claimed are defined as follows:

1. A distillation system comprising:
    at least one steam generating tank with means for receiving raw water from a source and generating steam and gases;
    at least one condenser for condensing at least some of the steam into distillate;
    a gas separating chamber with means for receiving gases from said at least one steam generating tank and distillate from said at least one condenser, said gas separating chamber at least partially separating gases from said distillate and said gases and discharging distillate therefrom; and
    a drain chamber connected to said gas separating chamber and comprising an upper section, a middle section and a lower section;
    said middle section having means for receiving blowdown waste water from said at least one steam generating tank, whereby at least some of said blowdown waste water flashes to steam when received in said middle section, at least some of the steam rises to said upper section, and at least some of the blowdown waste water being discharged to said lower section of said drain chamber;
    said drain chamber creating at least a partial vacuum to draw at least some of the separated gases from said gas separating chamber into said upper section, said upper section creating said partial vacuum by condensing steam and cooling gases within said upper section via heat transfer between the gases and steam and cooling water while the cooling water is separated from the gases and steam by at least one wall of said upper section;
    said lower section of said drain chamber cooling blowdown waste water and condensed liquid received from said middle section and said upper section, said lower section cooling blowdown waste water and condensed liquid via heat transfer between the blowdown waste water and condensed liquid and the cooling water while the cooling water is separated from the blowdown waste water and condensed liquid by at least one wall of said lower section of said drain chamber;
    said drain chamber condensing the steam to a liquid state and said lower section discharging the liquid to a drain;

said upper section of said drain chamber comprising a cooling water portion and a gas condensing portion separated by said at least one wall of said upper section, said gas condensing portion having means for receiving gases from said gas separating chamber, said cooling water portion having means for receiving cooling water for cooling the gases in said gas condensing portion.

2. A distillation system comprising:

at least one steam generating tank with means for receiving raw water from a source and generating steam and gases;

at least one condenser for condensing at least some of the steam into distillate;

a gas separating chamber with means for receiving gases from said at least one steam generating tank and distillate from said at least one condenser, said gas separating chamber at least partially separating gases from said distillate and said gases and discharging distillate therefrom; and a drain chamber connected to said gas separating chamber and comprising an upper section, a middle section and a lower section;

said middle section having means for receiving blowdown waste water from said at least one steam generating tank, whereby at least some of said blowdown waste water flashes to steam when received in said middle section, at least some of the steam rises to said upper section, and at least some of the blowdown waste water being discharged to said lower section of said drain chamber;

said drain chamber creating at least a partial vacuum to draw at least some of the separated gases from said gas separating chamber into said upper section, said upper section creating said partial vacuum by condensing steam and cooling gases within said upper section via heat transfer between the gases and steam and cooling water while the cooling water is separated from the gases and steam by at least one wall of said upper section;

said lower section of said drain chamber cooling blowdown waste water and condensed liquid received from said middle section and said upper section, said lower section cooling blowdown waste water and condensed liquid via heat transfer between the blowdown waste water and condensed liquid and the cooling water while the cooling water is separated from the blowdown waste water and condensed liquid by at least one wall of said lower section of said drain chamber;

said lower section of said drain chamber including a drain tube for draining cooled and condensed liquid from said drain chamber to a drain, said drain tube being configured to be partially blocked by the liquid to create said vacuum at said gas separating chamber;

said drain chamber comprising a cooling water portion and a condensing portion separated by said at least one wall, said cooling water portion being in fluid communication with cooling water and said condensing portion being in fluid communication with said gas separating chamber and said drain tube, said drain chamber separating the cooling water from said blowdown waste water, steam and gases by said at least one wall.

3. The distillation system of claim 2, wherein said drain chamber cools said blowdown waste water, steam and gases in said condensing portion with the cooling water in said cooling water portion to create said partial vacuum.

4. The distillation system of claim 3, wherein a flow rate of said cooling water into said cooling water portion is adjustable to control a level of said partial vacuum.

5. The distillation system of claim 3, wherein a flow rate of said blowdown waste water into said condensing portion is adjustable to control a level of said partial vacuum.

* * * * *